(12) United States Patent
McArdle et al.

(10) Patent No.: US 8,953,022 B2
(45) Date of Patent: Feb. 10, 2015

(54) SYSTEM AND METHOD FOR SHARING VIRTUAL AND AUGMENTED REALITY SCENES BETWEEN USERS AND VIEWERS

(75) Inventors: Terrence Edward McArdle, San Francisco, CA (US); Benjamin Zeis Newhouse, San Francisco, CA (US); Amir Akbarzadeh, San Francisco, CA (US)

(73) Assignee: Aria Glassworks, Inc., San Francisco, CA (US)

( * ) Notice: Subject to any disclaimer, the term of this patent is extended or adjusted under 35 U.S.C. 154(b) by 310 days.

(21) Appl. No.: 13/347,273

(22) Filed: Jan. 10, 2012

(65) Prior Publication Data

US 2012/0242798 A1    Sep. 27, 2012

Related U.S. Application Data

(60) Provisional application No. 61/431,196, filed on Jan. 10, 2011, provisional application No. 61/448,141, filed on Mar. 1, 2011.

(51) Int. Cl.

| | |
|---|---|
| *H04N 13/02* | (2006.01) |
| *H04N 21/422* | (2011.01) |
| *H04N 21/2743* | (2011.01) |
| *H04N 21/414* | (2011.01) |
| *H04N 21/4223* | (2011.01) |

(Continued)

(52) U.S. Cl.
CPC ..... *H04N 21/42202* (2013.01); *H04N 21/2743* (2013.01); *H04N 21/41407* (2013.01); *H04N 21/4223* (2013.01); *H04N 21/4312* (2013.01); *H04N 21/8352* (2013.01); *H04N 21/23412* (2013.01); *H04N 21/84* (2013.01)
USPC .......................................................... 348/46

(58) Field of Classification Search
CPC .......... H04N 21/4223; H04N 13/0014; G06T 19/006
See application file for complete search history.

(56) References Cited

U.S. PATENT DOCUMENTS

| | | |
|---|---|---|
| 5,287,437 A | 2/1994 | Deering |
| 5,841,439 A | 11/1998 | Pose et al. |

(Continued)

FOREIGN PATENT DOCUMENTS

WO    2008107553 A    9/2008

OTHER PUBLICATIONS

Easypano Holdings Inc, "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.orgverified date of Jul. 11, 2009, pp. 24-74.

(Continued)

*Primary Examiner* — Huy T Nguyen
(74) *Attorney, Agent, or Firm* — Kilpatrick Townsend & Stockton LLP

(57) ABSTRACT

A preferred method for sharing user-generated virtual and augmented reality scenes can include receiving at a server a virtual and/or augmented reality (VAR) scene generated by a user mobile device. Preferably, the VAR scene includes visual data and orientation data, which includes a real orientation of the user mobile device relative to a projection matrix. The preferred method can also include compositing the visual data and the orientation data into a viewable VAR scene; locally storing the viewable VAR scene at the server; and in response to a request received at the server, distributing the processed VAR scene to a viewer mobile device.

22 Claims, 13 Drawing Sheets

(51) Int. Cl.
  *H04N 21/431* (2011.01)
  *H04N 21/8352* (2011.01)
  *H04N 21/234* (2011.01)
  *H04N 21/84* (2011.01)

(56) References Cited

U.S. PATENT DOCUMENTS

| | | | |
|---|---|---|---|
| 5,990,941 A * | 11/1999 | Jackson et al. | ........... 348/207.99 |
| 6,226,669 B1 | 5/2001 | Huang et al. | |
| 6,389,179 B1 | 5/2002 | Katayama et al. | |
| 6,760,026 B2 | 7/2004 | Li et al. | |
| 7,133,068 B2 | 11/2006 | Fisher et al. | |
| 7,224,326 B2 | 5/2007 | Sefton | |
| 7,389,591 B2 | 6/2008 | Jaiswal et al. | |
| 7,424,218 B2 | 9/2008 | Baudisch et al. | |
| 7,499,586 B2 | 3/2009 | Agarwala et al. | |
| 7,564,469 B2 | 7/2009 | Cohen | |
| 8,041,574 B2 | 10/2011 | Yano | |
| 8,144,232 B2 | 3/2012 | Larson et al. | |
| 8,301,159 B2 | 10/2012 | Hamynen et al. | |
| 8,373,573 B2 | 2/2013 | Chou et al. | |
| 8,384,718 B2 | 2/2013 | Dahlke | |
| 8,730,156 B2 | 5/2014 | Weising et al. | |
| 2001/0030693 A1 | 10/2001 | Fisher et al. | |
| 2002/0158873 A1 * | 10/2002 | Williamson | ................. 345/427 |
| 2004/0027330 A1 | 2/2004 | Bradski | |
| 2005/0219239 A1 | 10/2005 | Mashitani et al. | |
| 2005/0286125 A1 | 12/2005 | Sundstrom et al. | |
| 2006/0050140 A1 * | 3/2006 | Shin et al. | ................. 348/14.02 |
| 2006/0082692 A1 | 4/2006 | Kamijima et al. | |
| 2007/0025723 A1 | 2/2007 | Baudisch et al. | |
| 2007/0035562 A1 | 2/2007 | Azuma et al. | |
| 2007/0076016 A1 | 4/2007 | Agarwala et al. | |
| 2007/0103543 A1 | 5/2007 | Anderson et al. | |
| 2007/0168418 A1 * | 7/2007 | Ratnakar | ....................... 709/204 |
| 2007/0236493 A1 | 10/2007 | Horiuchi et al. | |
| 2008/0042973 A1 | 2/2008 | Zhao et al. | |
| 2008/0071559 A1 | 3/2008 | Arrasvuori | |
| 2008/0082692 A1 | 4/2008 | Yano | |
| 2008/0094417 A1 | 4/2008 | Cohen | |
| 2008/0194323 A1 | 8/2008 | Merkli et al. | |
| 2008/0266326 A1 | 10/2008 | Porwal | |
| 2008/0280676 A1 | 11/2008 | Distanik et al. | |
| 2008/0292131 A1 | 11/2008 | Takemoto et al. | |
| 2008/0309508 A1 | 12/2008 | Harmon | |
| 2009/0140887 A1 | 6/2009 | Breed et al. | |
| 2009/0237564 A1 | 9/2009 | Kikinis et al. | |
| 2009/0240431 A1 | 9/2009 | Chau et al. | |
| 2009/0244097 A1 | 10/2009 | Estevez | |
| 2009/0292774 A1 | 11/2009 | Box et al. | |
| 2010/0002122 A1 | 1/2010 | Larson et al. | |
| 2010/0007657 A1 | 1/2010 | Rurin | |
| 2010/0066763 A1 | 3/2010 | MacDougall et al. | |
| 2010/0092079 A1 | 4/2010 | Aller | |
| 2010/0125816 A1 | 5/2010 | Bezos | |
| 2010/0161658 A1 | 6/2010 | Hamynen et al. | |
| 2010/0169837 A1 | 7/2010 | Hyndman | |
| 2010/0171758 A1 | 7/2010 | Maassel et al. | |
| 2010/0188397 A1 | 7/2010 | Tsai et al. | |
| 2010/0214111 A1 | 8/2010 | Schuler et al. | |
| 2010/0228633 A1 | 9/2010 | Guimaraes et al. | |
| 2010/0287485 A1 | 11/2010 | Bertolami et al. | |
| 2011/0041060 A1 | 2/2011 | Chien et al. | |
| 2011/0090252 A1 | 4/2011 | Yoon et al. | |
| 2011/0164116 A1 | 7/2011 | Gay et al. | |
| 2011/0201362 A1 | 8/2011 | Bregman-Amitai et al. | |
| 2011/0213861 A1 * | 9/2011 | Fanelli et al. | .................. 709/219 |
| 2011/0242134 A1 | 10/2011 | Miller et al. | |
| 2011/0248987 A1 | 10/2011 | Mitchell | |
| 2011/0273451 A1 | 11/2011 | Salemann | |
| 2012/0086728 A1 | 4/2012 | McArdle et al. | |
| 2012/0105440 A1 | 5/2012 | Lieberman et al. | |
| 2012/0113264 A1 | 5/2012 | Moshrefi et al. | |
| 2012/0212405 A1 | 8/2012 | Newhouse et al. | |
| 2012/0214590 A1 | 8/2012 | Newhouse et al. | |
| 2012/0218306 A1 | 8/2012 | McArdle et al. | |
| 2012/0236029 A1 | 9/2012 | Newhouse et al. | |
| 2012/0242656 A1 | 9/2012 | McArdle et al. | |
| 2012/0246223 A1 | 9/2012 | Newhouse et al. | |
| 2014/0092135 A1 | 4/2014 | McArdle et al. | |

OTHER PUBLICATIONS

Hewlett Packard, "HP Photosmart R717 Digital Camera with HP Instant Share User's Manual", Copyright 2005 Hewlett-Packard Development Company, L.P., downloaded from http://h1 0032.www1.hp.com/ctg/Manual/c00298985.pdf on May 3, 2013, pp. 50-54.

Ducket, Jon, "Beginning HTML, XHTML, CSS, and JavaScript (R)," Dec. 30, 2009, Wrox, p. 234.

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://ir.exp.sis.pitt.edu/res2/data/is/group5/>.

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

Hwang et al. "Hand-held virtual reality: a feasibility study." Proceedings of the ACM symposium on Virtual reality software and technology. ACM, 2006.

Fauster, Loris, and T. U. Wien. "Stereoscopic techniques in computer graphics." TU Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

Parr62, Ben; "Easter Egg: Yelp Is the iPhone's First Augmented Reality App,"; located at https://web.archive.org/web/20090829094113/http://mashable.com/2009/08/2007/yelp-aug . . . ; Aug. 27, 2009; 10 pages.

Hildenbrand, Jerry; "Yelp 2.0 brings monocle and checkins to its Android Client,"; located at http://www.androidcentral.com/yelp-20-brings-monocle-andcheckins-its-android-client; Jul. 5, 2010; 10 pages.

* cited by examiner

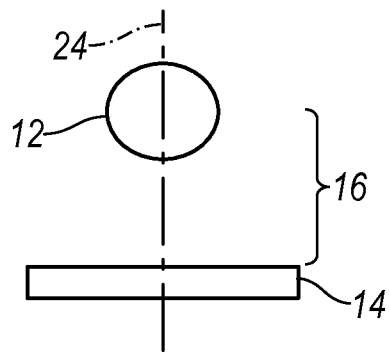 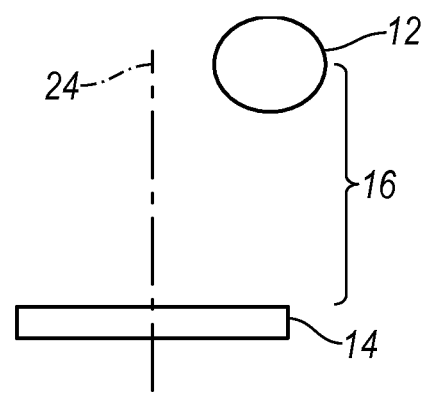
FIGURE 4E  FIGURE 4F
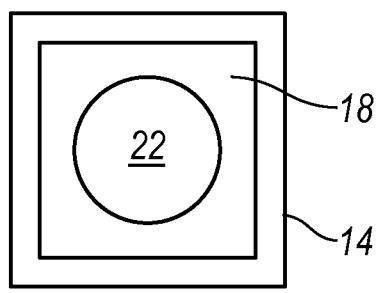 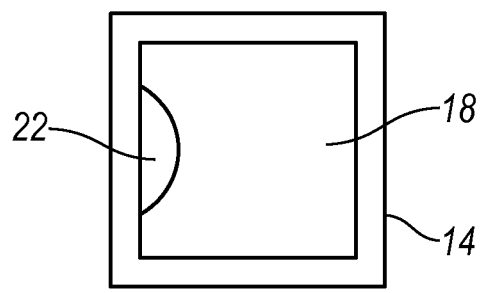
FIGURE 4G  FIGURE 4H

US 8,953,022 B2

SYSTEM AND METHOD FOR SHARING VIRTUAL AND AUGMENTED REALITY SCENES BETWEEN USERS AND VIEWERS

CLAIM OF PRIORITY

The present application claims priority to: U.S. Provisional Patent Application No. 61/431,196 filed on 10 Jan. 2011 and entitled "Method for Sharing Virtual and Augmented Reality Scenes," and U.S. Provisional Patent Application No. 61/448,141 filed on 1 Mar. 2011 and entitled "Method for Sharing Virtual and Augmented Reality Scenes," both of which are incorporated herein in their entirety by this reference.

TECHNICAL FIELD

This invention relates generally to the virtual and augmented reality field, and more specifically to a new and useful system and method for distributing virtual and augmented reality scenes between users and viewers.

BACKGROUND AND SUMMARY

Recent years have seen a rise in the capability to create and/or view augmented reality on mobile devices. Many of these augmented reality interfaces use data collected and made available by large companies. In particular, capturing data that can be used for virtual and augmented reality applications has mostly been limited to dedicated devices and setups. The public has not had technology readily available to them to simply create such virtual and augmented reality scenes. Furthermore, because of the amount of data involved in such virtual and augmented reality scenes, the sharing of such media would be greatly limited. Thus, there is a need in the virtual and augmented reality field to create a new and useful system and/or method for sharing virtual and augmented reality scenes. This invention provides such a new and useful system and/or method, the details of which are described below with reference to the following drawings.

BRIEF DESCRIPTION OF THE FIGURES

FIGS. 4A to 4M are schematic representations of a VAR scene being adjusted on a mobile device in accordance with the system and method of the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Systems

Figure 1:
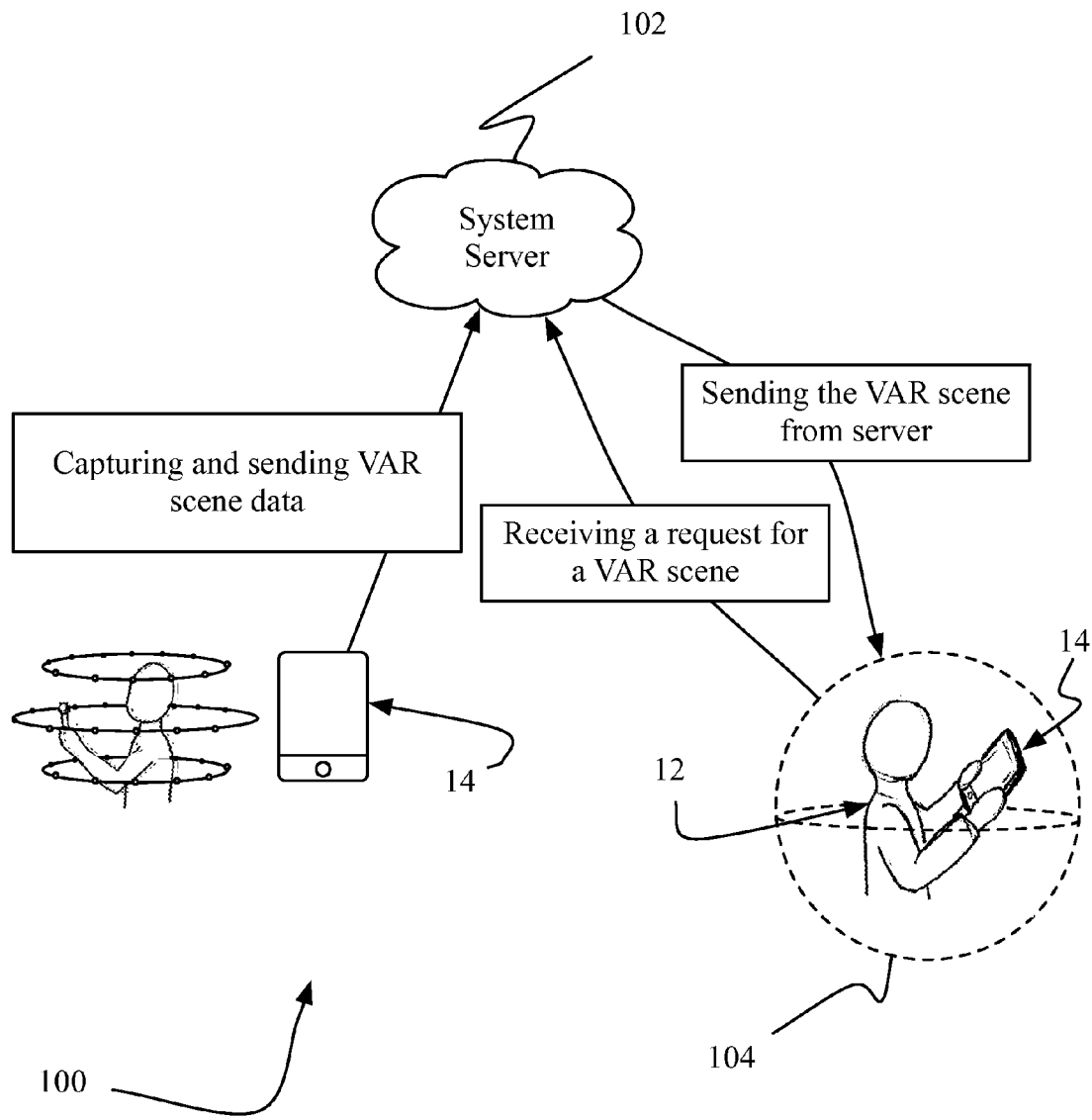
FIG. 1 schematic diagram of a system and method for sharing virtual and augmented reality scenes between users and viewers in accordance with preferred embodiments of the present invention.

As shown in FIG. 1, a system 100 of the preferred embodiment can include a user mobile device 14, a viewer mobile device 14, and a system server 102. As used herein, the user mobile device 14 and the viewer mobile device 14 are defined in terms of their function alone, and each type of device 14 is interchangeable with the other as described herein depending upon the use the device 14 is being put to by the user/viewer. The preferred user mobile device 14 can be used by a user to capture, process, create, and/or generate a viewable scene, such as for example a VAR scene. The preferred viewer mobile device 14 can be used by a viewer to receive, process, orient, render, generate, and/or view a viewable scene, such as for example a VAR scene.

Preferably, the user mobile device 14 and the viewer mobile device 14 are substantially similar. One or both of the user mobile device 14 and the viewer mobile device 14 can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating a projection matrix and/or the associated Euler angles. In the user mobile device 14 and/or the viewer mobile device 14, orientation and/or position information can be gathered in any suitable fashion, including device Application Programming Interfaces (API)

or through any suitable API exposing device information, e.g., using HTML5 to expose device information including orientation/location.

Figure 2:
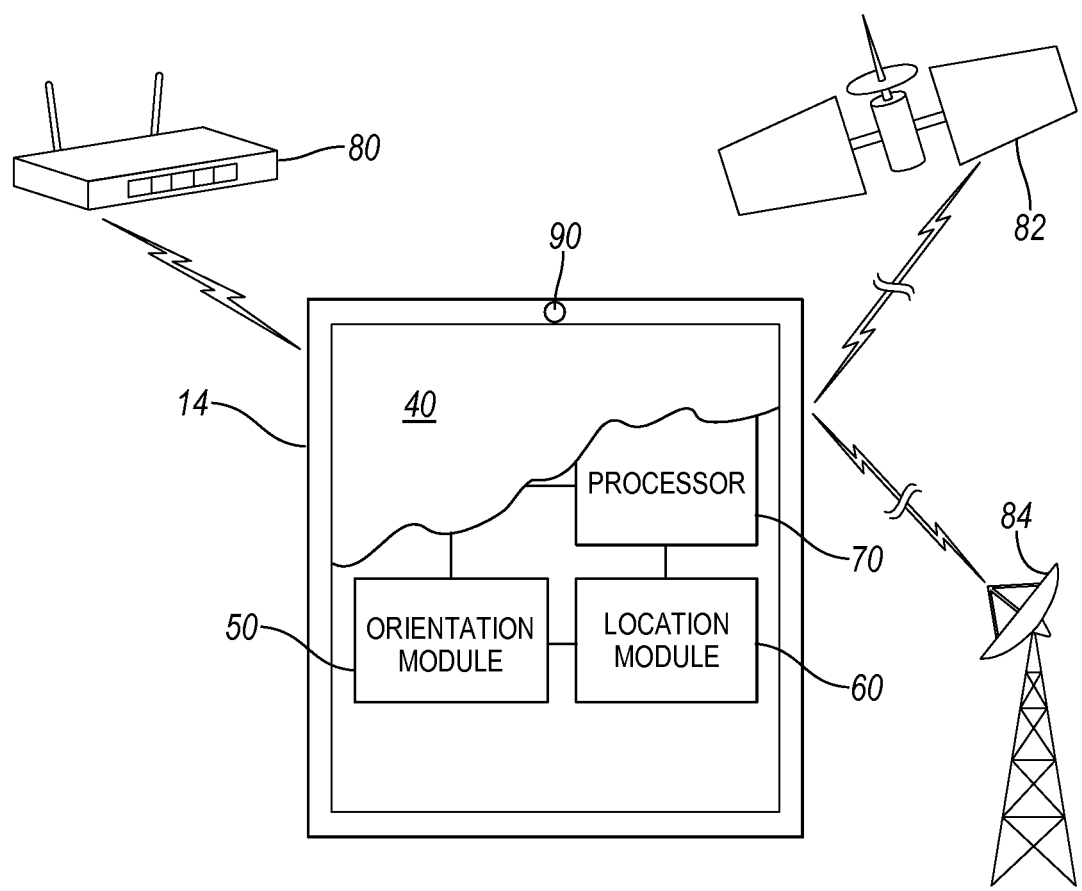
FIG. 2 is a schematic representation of a preferred device, system, and/or operating environment of a mobile device in accordance with the system and method of the preferred embodiments.

As shown in FIG. 2, the (user and/or viewer mobile) device 14 of the preferred embodiment can include a display 40, an orientation module 50 including a real orientation module and a user orientation module, a location module 60, a camera 90 oriented in substantially the same direction as the display 40, and a processor 70 connected to each of the display, orientation module 50, location module 60, and camera 90. The device 14 of the preferred embodiment preferably functions to capture and/or present a virtual and/or augmented reality (VAR) scene to a user from the point of view of a nodal point or center thereof, such that it appears to the user that he or she is viewing the world (represented by the VAR scene) through a frame of a window. The device 14 of the preferred embodiment can include any suitable type of mobile computing apparatus such as a smart phone, a personal computer, a laptop computer, a tablet computer, a television/monitor paired with a separate handheld orientation/location apparatus, or any suitable combination thereof.

As shown in FIG. 2, the orientation module 50 of the device 14 of the preferred embodiment includes at least a real orientation portion and a user orientation portion. The real orientation portion of the orientation module 50 preferably functions to provide a frame of reference for the device 14 as it relates to a world around it, wherein the world around can include real three dimensional space, a virtual reality space, an augmented reality space, or any suitable combination thereof. As noted below, the projection matrix can preferably include a mathematical representation of an arbitrary orientation of a three-dimensional object (i.e., the device 14) having three degrees of freedom relative to a second frame of reference. As noted in the examples below, the projection matrix can include a mathematical representation of the device 14 orientations in terms of its Euler angles (pitch, roll, yaw) in any suitable coordinate system.

In one variation of the device 14 of the preferred embodiment, the second frame of reference can include a three-dimensional external frame of reference (i.e., real space) in which the gravitational force defines baseline directionality for the relevant coordinate system against which the absolute orientation of the device 14 can be measured. In such an example implementation, the device 14 will have certain orientations corresponding to real world orientations, such as up and down, and further such that the device 14 can be rolled, pitched, and/or yawed within the external frame of reference. Preferably, the orientation module 50 can include a MEMS gyroscope configured to calculate and/or determine a projection matrix indicative of the orientation of the device 14. In one example configuration, the MEMS gyroscope can be integral with the orientation module 50. Alternatively, the MEMS gyroscope can be integrated into any other suitable portion of the device 14 or maintained as a discrete module of its own.

As shown in FIG. 2, the user orientation portion of the orientation module 50 preferably functions to provide a frame of reference for the device 14 relative to a point or object in space, including a point or object in real space. Preferably, the user orientation can include a measurement of a distance and/or rotational value/s of the device relative to a nodal point. In another variation of the device 14 of the preferred embodiment, the nodal point can include a user's head such that the user orientation includes a measurement of the relative distance and/or rotational value/s of the device 14 relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. Preferably, as shown in FIG. 3, the user orientation portion of the orientation module 50 can function to create a viewing relationship between a viewer 12 (optionally located at the nodal point) and the device 14, such that a change in user orientation can cause a consummate change in viewable content consistent with the user's VAR interaction, i.e., such that the user's view through the frame will be adjusted consistent with the user's orientation relative to the frame.

As shown in FIG. 2, one variation of the device 14 of the preferred embodiment includes a location module 60 connected to the processor 70 and the orientation module 50. The location module 60 of the preferred embodiment functions to determine a location of the device 14. As noted above, location can refer to a geographic location, which can be indoors, outdoors, above ground, below ground, in the air or on board an aircraft or other vehicle. Preferably, as shown in FIG. 2, the device 14 of the preferred embodiment can be connectable, either through wired or wireless means, to one or more of a satellite positioning system 82, a local area network or wide area network such as a WiFi network 80, and/or a cellular communication network 84. A suitable satellite position system 82 can include for example the Global Positioning System (GPS) constellation of satellites, Galileo, GLONASS, or any other suitable territorial or national satellite positioning system. In one alternative embodiment, the location module 60 of the preferred embodiment can include a GPS transceiver, although any other type of transceiver for satellite-based location services can be employed in lieu of or in addition to a GPS transceiver.

The processor 70 of the device 14 of the preferred embodiment functions to manage the presentation of the VAR scene to the viewer 12. In particular, the processor 14 preferably functions to display a scene to the viewer 12 on the display 40 in response to the real orientation and the user orientation. The processor 70 of the preferred embodiment can be configured to process, compute, calculate, determine, and/or create a VAR scene that can be displayed on the device 14 to a viewer 12, wherein the VAR scene is oriented to mimic the effect of the viewer 12 viewing the VAR scene as if through the frame of the device 12. Preferably, orienting the scene can include preparing a VAR scene for display such that the viewable scene matches what the user would view in a real three-dimensional view, that is, such that the displayable scene provides a simulation of real viewable space to the viewer 12 as if the device 14 were a transparent frame. As noted above, the scene is preferably a VAR scene; therefore it can include one or more virtual and/or augmented reality elements composing, in addition to, and/or in lieu of one or more real elements (buildings, roads, landmarks, and the like, either real or fictitious). Alternatively, the scene can include processed or unprocessed images/videos/multimedia files of one or more displayable scene aspects, including both actual and fictitious elements as noted above.

Figure 3:
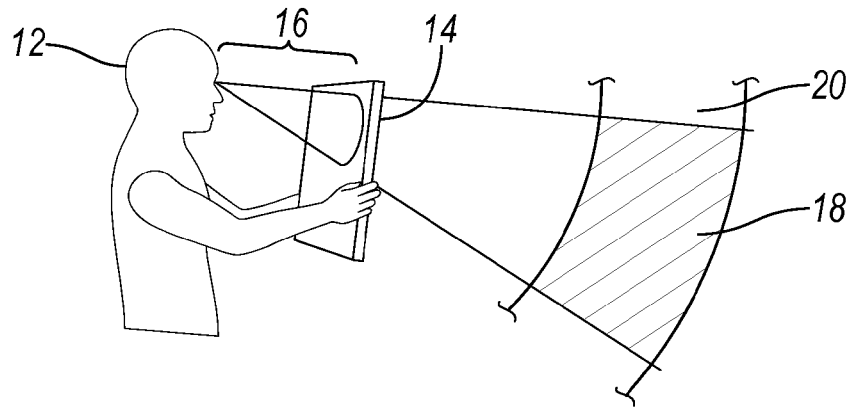
FIG. 3 is a schematic view of a user or viewer interacting with a mobile device in accordance with the system and method of the preferred embodiments.

As shown in FIG. 3, in another variation of the device 14 of the preferred embodiment, the VAR scene can include a spherical image 20. Preferably, the portion of the spherical image (i.e., the VAR scene 18) that is displayable by the device 14 corresponds to an overlap between a viewing frustum of the device (i.e., a viewing cone projected from the device) and the imaginary sphere that includes the spherical image 20. The scene 18 is preferably a portion of the spherical image 20, which can include a substantially rectangular display of a concave, convex, or hyperbolic rectangular portion of the sphere of the spherical image 20. Preferably, the nodal point is disposed at approximately the origin of the spherical image 20, such that a viewer 12 has the illusion of being located at the center of a larger sphere or bubble having the VAR scene displayed on its interior. Alternatively, the nodal point can be disposed at any other suitable vantage point within the spherical image 20 displayable by the device 14. In another alternative, the displayable scene can include a substantially planar and/or ribbon-like geometry from which the nodal point is distanced in a constant or variable fashion. Preferably, the display of the scene 18 can be performed within a 3D or 2D graphics platform such as OpenGL, WebGL, or Direct 3D. Alternatively, the display of the scene 18 can be performed within a browser environment using one or more of HTML5, CSS3, or any other suitable markup language. In another variation of the device 14 of the preferred embodiment, the geometry of the displayable scene can be altered and/or varied in response to an automated input and/or in response to a user input.

In another variation of the device 14 of the preferred embodiment, the processor 70 can be further configured to adapt the scene displayable on the device 14 to the user 12 in response to a change in one of the real orientation or the user orientation. The processor 70 preferably functions to alter, change, reconfigure, recompute, regenerate, and/or adapt the displayable scene in response to a change in the real orientation or the user orientation in order to create a uniform and immersive user experience by adapting the displayable scene consistent with movement of the device 14 relative to the projection matrix and/or relative to the nodal point. Preferably, adapting the displayable scene can include at least one of the processor 70 adjusting a virtual zoom of the scene, the processor 70 adjusting a virtual parallax of the scene, the processor 70 adjusting a virtual perspective of the scene, and/or the processor 70 adjusting a virtual origin of the scene. Alternatively, adapting the displayable scene can include any suitable combination of the foregoing, performed by the processor 70 of the preferred embodiment substantially serially or substantially simultaneously, in response to a timing of any determined changes in one or both of the real orientation or the user orientation.

As shown in FIGS. 4A, 4B, 4C, and 4D, in one variation of the device 14 of the preferred embodiment, the processor is further configured to adjust a virtual zoom of the scene 18 in response to a change in a linear distance 16 between the device 14 and the nodal point 12. As shown in the FIGURES, the processor 70 of the preferred embodiment can be configured to alter a size of an aspect 22 of the scene 18 in response to an increase/decease in the linear distance 16 between the device 14 and the nodal point 12, i.e., the user's head. In another variation of the device 14 of the preferred embodiment, the device 14 can be configured to measure a distance 16 between the device 14 and the nodal point 12, which can include for example using a front facing camera 90 to measure the relative size of the nodal point 12 in order to calculate the distance 16. Alternatively, the adjustment of the virtual zoom can be proportional to a real zoom (i.e., a real relative sizing) of the nodal point 12 as captured by the device camera 90. As noted above, preferably as the distance decreases/increases, the size of the user's head will appear to increase/decrease, and the adjustment in the zoom can be linearly and/or non-linearly proportional to the resultant increase/decrease imaged by the camera 90. Alternatively, the distance 16 between the nodal point 12 and the device 14 can be measured and/or inferred from any other suitable sensor and/or metric, including at least those usable by the device 14 in determining the projection matrix as described above, including for example one or more cameras 90 (front/rear), an accelerometer, a gyroscope, a MEMS gyroscope, a magnetometer, a pedometer, a proximity sensor, an infrared sensor, an ultrasound sensor, and/or any module, portion, or component of the orientation module 50.

As shown in FIGS. 4E, 4F, 4G, and 4H, the processor 70 of the device of the preferred embodiment can be further configured to adjust a virtual parallax of the scene 18 in response to a change in a translational distance between the device 14 and the nodal point 12. As shown in FIG. 4F, movement of the device 14 relative to the nodal point 12 in a direction substantially perpendicular to imaginary line 24 can be interpreted by the processor 70 of the preferred embodiment as a request and/or input to move one or more aspects 22 of the scene 18 in a corresponding fashion. As shown in FIGS. 4L and 4M, the scene can include a foreground aspect 22 that is movable by the processor 70 relative to a background aspect 30. In another variation of the device 14 of the preferred embodiment, the processor 70 can be configured to identify one or more foreground aspects 22 and/or background aspects 30 of the displayable scene 18.

In another variation of the device 14 of the preferred embodiment, the processor 70 can be configured to measure a translational distance between the device 14 and the nodal point 12, which can include for example using a front facing camera 12 to measure the relative size and/or location of the nodal point 12 (i.e., the user's head) in order to calculate the translational distance. Alternatively, the translational distance between the nodal point 12 and the device 14 can be measured and/or inferred from any other suitable sensor and/or metric, including at least those usable by the device 14 in determining the projection matrix as described below, including for example one or more cameras 90 (front/rear), an accelerometer, a gyroscope, a MEMS gyroscope, a magnetometer, a pedometer, a proximity sensor, an infrared sensor, an ultrasound sensor, and/or any module, portion, or component of the orientation module 50.

Preferably, the translational distance is computed by the processor 70 as a function of both the size of the nodal point 12 (from the front facing camera 90) and a detection of a planar translation of the device 14 in a direction substantially orthogonal to the direction of the camera 90, thus indicating a translational movement without any corrective rotation. For example, one or more of the aforementioned sensors can determine that the device 14 is moved in a direction substantially orthogonal to the camera direction 90 (along imaginary line 24 in FIGS. 4E and 4F), while also determining that there is no rotation of the device 14 about an axis (i.e., axis 28 shown in FIG. 4J) that would direct the camera 90 radially inwards towards the nodal point 12. Preferably, the processor 70 of the device 14 of the preferred embodiment can process the combination of signals indicative of such a movement as a translational shift of the device 14 relative to the nodal point 12 and adapt a virtual parallax of the viewable scene accordingly.

Figure 4A:
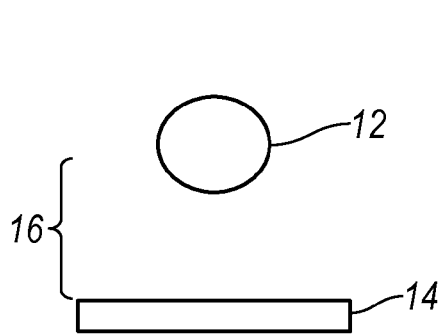
Figure 4B:
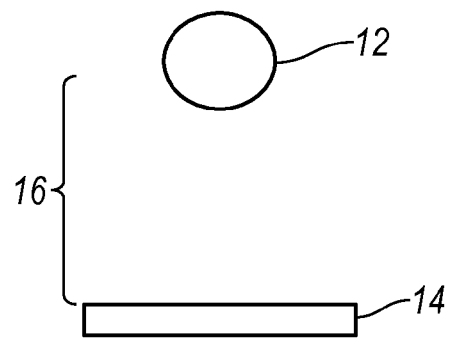
Figure 4C:
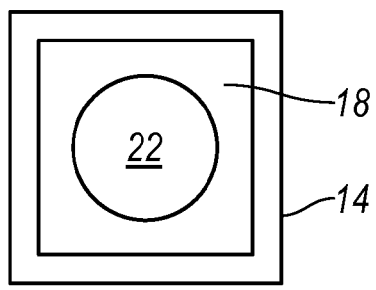
Figure 4D:
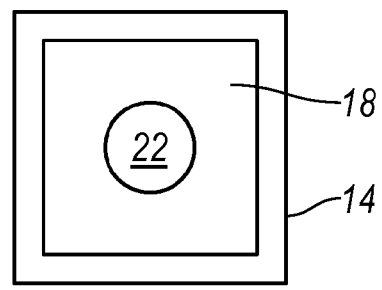
Figure 4I:
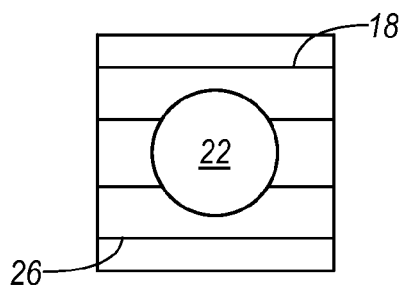
Figure 4J:
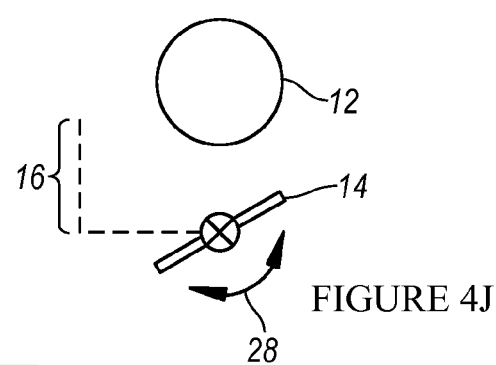
Figure 4K:
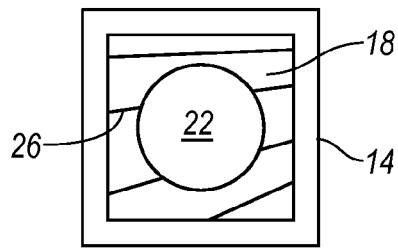
Figure 4L:
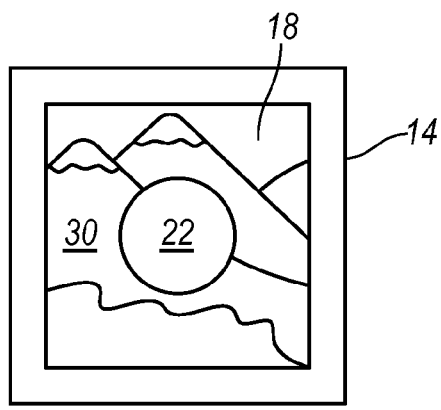
Figure 4M:
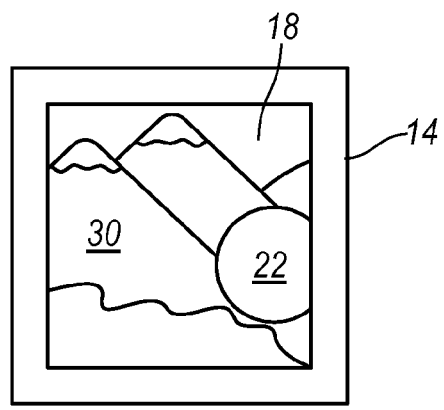

As shown in FIGS. 4I, 4J, and 4K, the processor 70 of the device 14 of the preferred embodiment can be further configured to adjust a virtual perspective of the scene 18 in response to a change in a rotational orientation of the device 14 and the nodal point 12. The processor 70 can preferably function to reorient, reshape, resize, and/or skew one or more aspects 22, 26 of the displayable scene 18 to convey a sense of perspective and/or a non-plan viewing angle of the scene 18 in response to a rotational movement of the device 14 relative to the nodal point 12. As noted above, adjustment of the virtual perspective of the scene is related in part to a distance between one end of the device and the nodal point and a distance between the other end of the device and the nodal point 12. As shown in FIG. 4J, rotation of the device 14 about axis 28 brings one side of the device 14 closer to the nodal point 12 than the other side, while leaving the top and bottom of the device 14 relatively equidistant from the nodal point 12.

As shown in FIG. 4K, preferred adjustment of aspects 22, 26 of the scene to create the virtual perspective will apply both to foreground aspects 22 and background aspects 26. The processor 70 of the preferred embodiment can adjust the virtual perspective of each aspect 22, 26 of the scene 18 in response to at least its position in the scene 18, the degree of rotation of the device 14 relative to the nodal point 12, the relative depth (foreground/background) of the aspect 22, 26, and/or any other suitable metric or visual cue. As noted above and as shown, lines that are parallel in the scene 18 when the device 14 is directed at the nodal point 12 shown in FIG. 4I will converge in some other direction in the display as shown in FIG. 4K as the device 14 is rotated as shown in FIG. 4J.

In another variation of the device 14 of the preferred embodiment, the processor 70 can be configured to reorient, reshape, resize, and/or translate one or more aspects of the displayable scene 18 in response to the detection of actual movement of the nodal point 12. As noted above, the nodal point can include an arbitrary point in real or fictitious space relative to which the scenes 18 described herein are displayable. Accordingly, any movement of the real or fictitious nodal point 12 preferably results in a corresponding adjustment of the displayable scene 18 by the processor 70. In another variation of the device 14 of the preferred embodiment noted above, the nodal point 12 can include a user's head or any suitable portion thereof.

Preferably, one of more portions or modules of the orientation module 50 can detect movement of the nodal point 12 in real space, which movements can be used by the processor 70 creating the corresponding adjustments in the displayable scene 18. The real position of the nodal point 12 can preferably be determined using any suitable combination of devices, including for example one or more cameras (front/rear), an accelerometer, a gyroscope, a MEMS gyroscope, a magnetometer, a pedometer, a proximity sensor, an infrared sensor, an ultrasound sensor and/or any module, portion, or component of the orientation module 50. As an example, a user 12 can wear a pedometer in communication with the device such that when the user walks through real space, such movement of the user/nodal point 12 is translated into movement in the VAR space, resulting in a corresponding adjustment to the displayable scene 18. Alternatively, the location module 60 of the device 14 of the preferred embodiment can determine a position and/or motion of the device 14 in response to a global positioning signal associated with the device 14. Preferably, real and/or or simulated movement of the user/nodal point 12 in space can result in the adjustment of the location of the origin/center/viewing point of the displayable scene 18.

In another variation of the device 14 of the preferred embodiment, the processor 70 can be further configured to display a floating-point exposure of the displayable scene in order to minimize lighting irregularities. As noted above, the displayable scene 18 can be any suitable geometry, including for example a spherical image 20 disposed substantially symmetrically about a nodal point 12 as shown in FIG. 3. Displaying a floating-point exposure preferably functions to allow the user to view/experience the full dynamic range of the image without having to artificially adjust the dynamic range of the image. Preferably, the processor 70 of the preferred embodiment is configured to globally adjust the dynamic range of the image such that a portion of the image in the center of the display is within the dynamic range of the device. As noted above, comparable high dynamic range (HDR) images appear unnatural because they attempt to confine a large image range into a smaller display range through tone mapping, which is not how the image is naturally captured by a digital camera.

As shown in FIG. 3, preferably the processor 70 preserves the natural range of the image 20 by adjusting the range of the image 20 to always fit around (either symmetrically or asymmetrically) the portion of the image 18 viewable in the approximate center of the device's display 40. As noted above, the device 14 of the preferred embodiment can readily adjust one or more aspects of the displayable scene 18 in response to any number of potential inputs relating to the orientation of the device 14 and/or the nodal point 12. Accordingly, the device 14 of the preferred embodiment can further be configured to adjust a floating point exposure of the displayable scene 18 in response to any changes in the displayable scene 18, such as for example adjustments in the virtual zoom, virtual parallax, virtual perspective, and/or virtual origin described in detail above.

2. Methods

Figure 6:
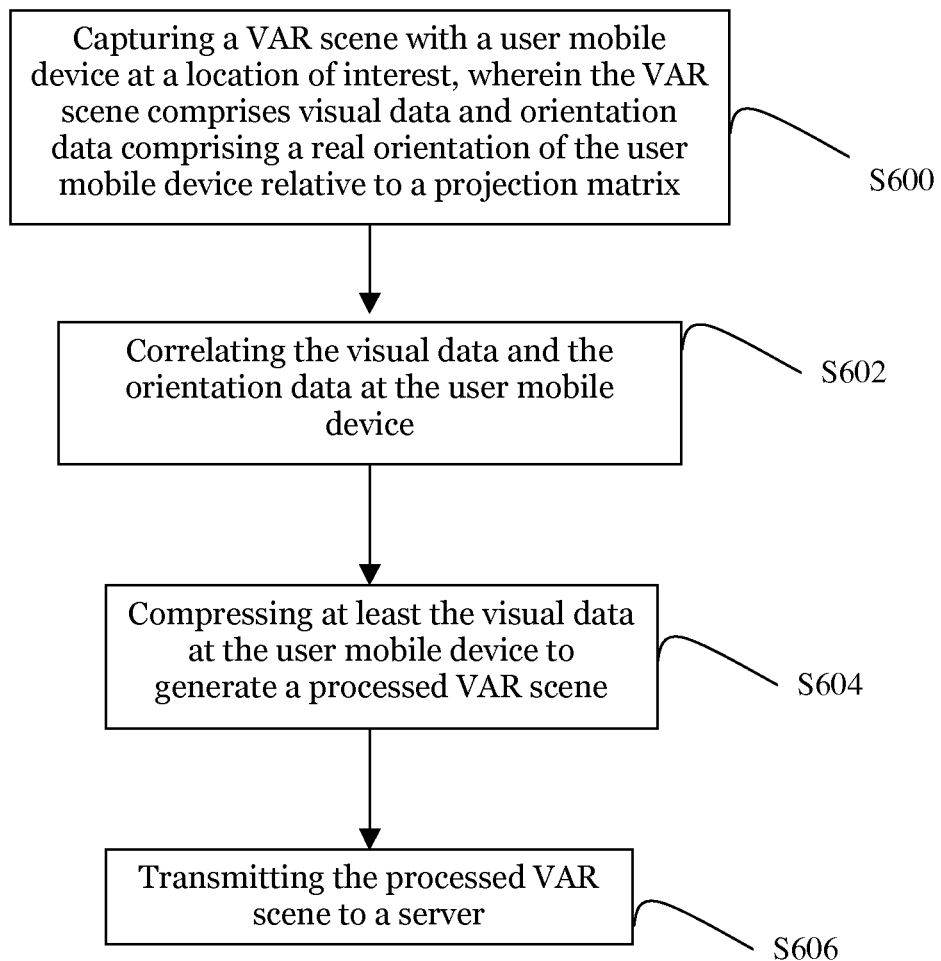
FIG. 6 is a flowchart depicting a method of sharing virtual and augmented reality scenes between users and viewers in accordance with a preferred embodiment of the present invention.

As shown in FIG. 6, a method of the first preferred embodiment can include capturing a virtual and/or augmented reality (VAR) scene with a user mobile device at a location of interest, wherein the VAR scene can include visual data and orientation that can include a real orientation of the user mobile device relative to a projection matrix in block S600. The first preferred method can further include correlating the visual data and the orientation data at the user mobile device in block S602, compressing at least the visual data at the user mobile device to generate a processed VAR scene in block S604, and transmitting the processed VAR scene to a server in block S606. The first preferred method can function to assist a user in the capture, processing, and transmission of a user-generated VAR scene to a remote server that can be configured for storage and distribution of the VAR scene to one or more viewers. The first preferred method can further functions to transform a VAR scene captured by a particular user device into an accessible media file that can be experienced by a number of viewers on any number and type of different viewer devices.

As shown in FIG. 6, the first preferred method can include block S600, which recites capturing a VAR scene with a user mobile device at a location of interest. Preferably, the VAR scene can include one or both of visual data and orientation, and preferably the orientation data can include a real orientation of the user mobile device relative to a projection matrix. Additionally, the VAR scene can include audio data in combination with still image data and/or video data. Block Shoo preferably functions to provide a user with a predetermined pattern or script to use his or her mobile device to capture a VAR scene. Preferably, the VAR scene can include one or more still images arranged in a substantially spherical format such that the user is photographically capturing a bubble around his or her position. Alternatively, the VAR scene can include any number of still and/or video images in any other suitable format, such as planar, ribbon-like, hemispherical, or any combination thereof. A user can preferably be instructed and/or prompted on a suitable manner or means to acquire the VAR scene, including any systems or methods disclosed in the inventors' co-pending patent application Ser. No. 13/302, 977 entitled "System and Method for Acquiring Virtual and Augmented Reality Scenes by a User," filed on 22 Nov. 2011 and assignable to the assignee of the present application.

In one variation of the first preferred method, block S600 can include providing a user with a predetermined pattern for image acquisition with the user mobile device in block and in response to a user input, acquiring at least one image at a location of interest. The first preferred method can further include in response to the acquisition of at least one image, providing the user with feedback to ensure a complete acquisition of the virtual or augmented reality (VAR) scene. The first preferred method functions to reduce provide for a uniform, simple, and comprehensive manner in which one or more users can collect image data about their respective surrounding environments. The first preferred method further functions to create uniformly accessible VAR scenes, which can be retrieved from one or more users and provided to one or more viewers through network access to a remote server as described below. As noted above, the images acquired can be either two-dimensional or three-dimensional images, and they can be either still photographs or one or more frames of a video sequence.

Enabling capture of spatial imagery by common mobile devices preferably further functions to enable widespread, crowd-generated, spatially assigned image data. Since untrained users are expected to capture the images, the first preferred method preferably further functions to unobtrusively guide the capture process so that novice photographers will be able to acquire usable quality VAR scenes. One preferred variation of the method utilizes game play mechanics to encourage proper capture of scene imagery. The game play mechanics preferably provide a task-based challenge for the user with device orientation as a central control mechanic. In the background of a game-like interaction, the game preferably results in the user properly orienting the user mobile device for the capture of a scene. Other non-game like interactions can alternatively be used. Preferably, a user acquires images by directing the user mobile device outward as shown in FIG. 1 and systematically spins and directs the camera at particular orientations to acquire all desired visual data for the VAR scene. In the end, an image of a spherical space is preferably created to simulate the world viewable in any direction from the perspective of the user.

A preferred predetermined pattern for visual data acquisition does not contain undesirable "holes" or voids in the image data. The preferred predetermined pattern can be used to form a spatial image scene that can be described as a surface in the shape of a sphere, plane, cylinder, planar path, curved plane, or any suitable surface. For example, if a full spherical image is the objective, the predetermined pattern preferably guides the user to move the image capture device in a way that collects image data from the whole world around the user. The poles of a sphere or other singularities can be special conditions that the predetermined pattern includes. As another example, if a user is capturing a plane of image data while walking, the predetermined pattern preferably ensures that a full plane worth of image data with no holes is captured. As used herein, the preferred predetermined pattern can include a programmatically determined pattern that is subject to user override (i.e., through the user actuating the user interface as desired). Alternatively, some or all aspects of the preferred predetermined pattern can be compulsory (i.e., through a feedback mechanism of the type described below) to ensure proper acquisition of the image/s.

In another variation of the first preferred method, capturing a VAR scene can include acquiring at least one image in a floating-point format to ensure full dynamic spectrum of the virtual or augmented reality scene. As previously noted, the VAR scene can be any suitable geometry, including for example a spherical image disposed substantially symmetrically about a nodal point. Acquisition of the VAR visual data in a floating-point exposure preferably functions to allow the user to view/experience the full dynamic range of the image without having to artificially adjust the dynamic range of the images/scene. Preferably, the first preferred method globally adjusts the dynamic range of each image as it is acquired such that a portion of the image in the center of the display is within the dynamic range of the device. By way of comparison, high dynamic range (HDR) images appear unnatural because they attempt to confine a large image range into a smaller display range through tone mapping, which is not how the image is naturally captured by a digital camera. Preferably, the first preferred method preserves the natural range of the image by adjusting the range of the image to always fit around (either symmetrically or asymmetrically) the portion of the image viewable in an approximate center a display on which it is to be viewed. As noted elsewhere herein, the acquired image can include for example a video, a series of still photographs, or any suitable combination thereof. Accordingly, the first preferred method can further include adjusting the floating point exposure of the acquired images in response to any changes in the sequence of images that make up the VAR scene, such as for example adjustments in the lighting as a user progresses through a series of still images.

As shown in FIG. 6, the first preferred method can further include block S602, which recites correlating the visual data and the orientation data at the user mobile device. Suitable visual data can include for example one or more still images arranged in any suitable fashion, such as a substantially spherical series or collection of images. Visual data can alternatively or additionally include one or more video elements such as spherical video frames. The orientation data preferably includes sensor data derived by the user mobile device, such as for example data received from a gyroscope, a MEMS gyroscope, an accelerometer, a magnetometer, a global position system (GPS), an altitude sensor, or any suitable combination thereof. Preferably, the sensors are integrated into the user mobile device. Alternatively, one or more sensors can be disintegrated or discrete from the user mobile device, such that the user mobile device can retrieve the appropriate sensor data from the outboard sensor via wired or wireless connections. Block S602 preferably functions to pair one or more aspects of the visual data with one or more aspects of the orientation data such that each of the visual data and the orientation data can be disassembled and reassembled according to the proper location and/or orientation of the user mobile device at the time the VAR scene was captured. As an example, in a series of still images arranged in a spherical format, the user mobile device will have a substantially unique orientation for each discrete image. Accordingly, each discrete image of the visual data can preferably be correlated with the orientation data of the user mobile device associated with the capture of the discrete image. Preferably, correlation of the visual data and the orientation data can include merging the visual data and the orientation data into a single media file. Alternatively, correlation of the visual data and the orientation data can include discrete pairings of still images and/or video frames with discrete selections of data representing the orientation of the user mobile device.

As shown in FIG. 6, the first preferred method can further include block S604, which recites compressing at least the visual data at the user mobile device to generate a processed VAR scene. Block S604 preferably functions to minimize, streamline, and/or optimize a file size of at least the visual data for ease of transmission to the server. Alternatively, block S604 can further include compressing the orientation data with the visual data and/or a combination of the orientation data and the visual data. Optionally, block S604 can be substantially and/or selectively omitted from performance of the first preferred method in response to one or more external conditions, including for example a file size, a relative increase/decrease in available bandwidth, any requirements as to data fidelity, processing speeds, or any other suitable network, hardware, and/or user-defined condition. In one alternative, compression of the visual data can include downsampling one or more still images and/or video frames. Preferably, the down-sampled visual data can be fit onto a single large texture, which in turn can be rendered as a collection of individual frames/images placed tangentially on an imaginary sphere with corresponding orientation data for each portion of the visual data. As an example, approximately two hundred lower resolution images can be fit into a 2048×2048 pixel texture.

Figure 8:
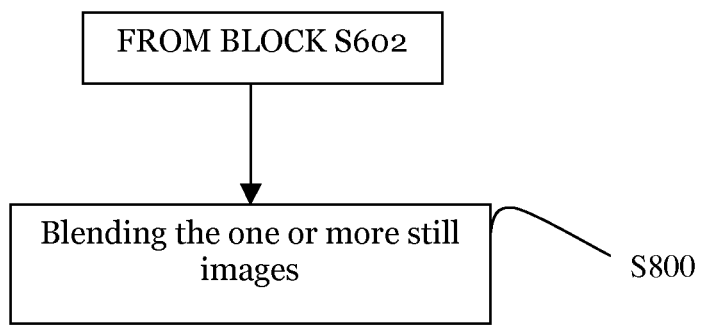
FIG. 8 is a flowchart depicting a method of sharing virtual and augmented reality scenes between users and viewers in accordance with another variation of the preferred embodiment of the present invention.

As shown in FIG. 8, in one variation of the first preferred method, compressing the visual data can include blending one or more still images, which can preferably include performing one or more processes at the edges of the images to improve the quality of the entire VAR scene. Suitable blending processes can include for example premultiplying a still image with one or more of a Gaussian kernel, a smoothstep kernel, or any other suitable mathematical or image processing function. Preferably, video data can be compressed and/or altered according to any suitable video compression technique or standard. The visual data, orientation data, and/or audio data can preferably be formatted into a single data file, for example by storing each set of data as a track within a media file, i.e. the processed VAR of block S604. Alternatively, the processed VAR can include the visual data, orientation data, and/or audio data storable and/or transmittable as separate discrete data files with association or correlation through positioning, clock/timing, and/or indexing parameters. Preferably, the foregoing image processing is optimized for performance on a user mobile device in response to its processing capabilities and the speed and/or reliability of a connection with the server.

As shown in FIG. 6, the first preferred method can include block S606, which recites transmitting the processed VAR scene to a server. Block S606 preferably functions to upload, transfer, distribute, and/or transmit the processed VAR scene data from the user mobile device to a remote server while ensuring the fidelity and completeness of the processed VAR scene received at the server. The processed VAR scene data can be relatively large data file for transmission from a mobile device, particularly over a wireless or cellular network. To assist in the transmission of the processed VAR scene, an initial request (e.g., an AJAX request) is preferably sent to the system server to notify the server of incoming processed VAR scene. Additional parameters of the processed VAR scene can additionally be included in this initial request. For example, the position of the VAR scene (GPS location), title, author, time, date, and any suitable meta-data can be included in the initial request. Such information can optionally be published to a social stream or website prior to completing upload of the processed VAR scene. Processed VAR scene information, including the aforementioned metadata, can alternatively be published after successful uploading, processing on the system server, or at any suitable point. The processed VAR scene is preferably uploaded in response to successful receipt of the initial request by the server. The visual data, a preview image, the orientation data, and/or any audio data can preferably be uploaded asynchronously. Alternatively, a universally unique identifier (UUID) can be used as a hash of the pathname of the visual data files, which preferably functions to alleviate concerns of reserving space for the processed VAR scene before uploading and further enables data to be uploaded out of order. As an alternative any suitable uploading procedure may alternatively be used.

Figure 7:
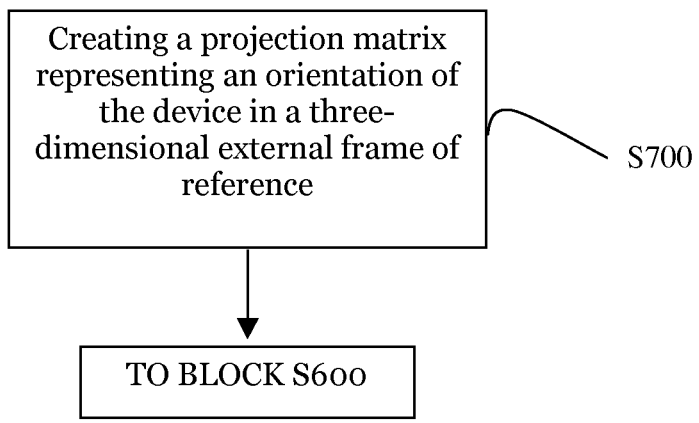
FIG. 7 is a flowchart depicting a method of sharing virtual and augmented reality scenes between users and viewers in accordance with a variation of the preferred embodiment of the present invention.

As shown in FIG. 7, another variation of the first preferred method can include block S700, which recites creating a projection matrix representing an orientation of the user mobile device in a three-dimensional external frame of reference. Block S700 preferably functions to coordinate the captured and displayable scene with a physical orientation of the user mobile device as established by and/or relative to a user. The projection matrix preferably includes a mathematical representation of an arbitrary orientation of a three-dimensional object having three degrees of freedom relative to the external frame of reference. In one variation of the first preferred method, the external frame of reference can include a three-dimensional external frame of reference (i.e., real space) in which the gravitational force defines baseline directionality for the relevant coordinate system against which the absolute orientation of the user mobile device can be measured. As an example, the projection matrix can include a mathematical representation of the user mobile device's orientation in terms of its Euler angles (pitch, roll, yaw) in any suitable coordinate system. Preferably, the user mobile device can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating the projection matrix and/or the associated Euler angles. Orientation and/or position information can be gathered in any suitable fashion, including device Application Programming Interfaces (API) or through any suitable API exposing device information, e.g., using HTML5 to expose device information including orientation/location.

In another variation of the first preferred method, the orientation data can include a user orientation of the user mobile device relative to a nodal point. As noted above, a VAR scene can include a substantially spherical or spheroidal composite of images surrounding an origin, which can be a nodal point. The user orientation of the user mobile device preferably functions to permit a user and/or the user mobile device to image an entire complete view of the space surrounding the nodal point. Preferably, the nodal point is substantially coincident with a user, a user's head, or a portion of the user's head (i.e., a point between the user's eyes). Alternatively, the nodal point can be substantially coincident with the user mobile device. In another alternative, the nodal point can be any arbitrary point in space within or without the VAR scene as determined by the user, the type of VAR scene the user is acquiring, or any other suitable parameter.

Figure 9:
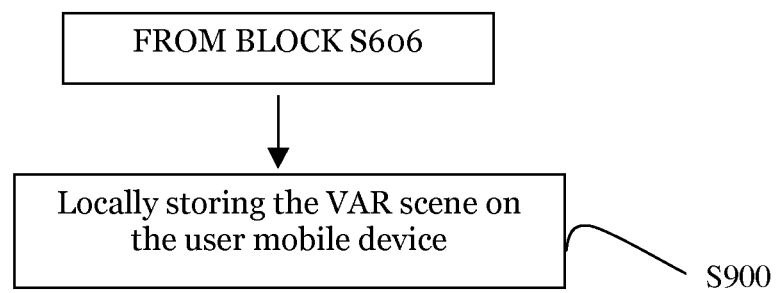
FIG. 9 is a flowchart depicting a method of sharing virtual and augmented reality scenes between users and viewers in accordance with another variation of the preferred embodiment of the present invention.

As shown in FIG. 9, another variation of the first preferred method can include locally storing the VAR scene on the user mobile device in block S900. Block S900 preferably functions to locally maintain the visual data, the orientation data, and/or the audio data that compose the VAR scene within an integrated or local memory storage component of the user mobile device. The VAR scene can be stored in one or both of a processed or unprocessed format. Preferably, the VAR scene can be locally stored on the user mobile device for a predetermined time period, which can include for example until the user erases the VAR scene and/or underlying data, until the processed VAR scene is successfully transmitted to the server, and/or until the local memory of the user mobile device dictates removal or some or all of the VAR scene data. Preferably, the VAR scene can be locally stored until receipt of a successful transmission communication from the server, indicating that the entire VAR scene is captured and stored remotely. Alternatively, block S900 can include storing the VAR scene and/or VAR scene metadata indefinitely. Preferably, at least the VAR scene metadata can remain locally stored on the user mobile device so that the user can readily identify, retrieve, view, and/or interact with his or her VAR scenes on the server by comparing and/or matching the VAR scene metadata stored on the user mobile device and the server.

Figure 10:
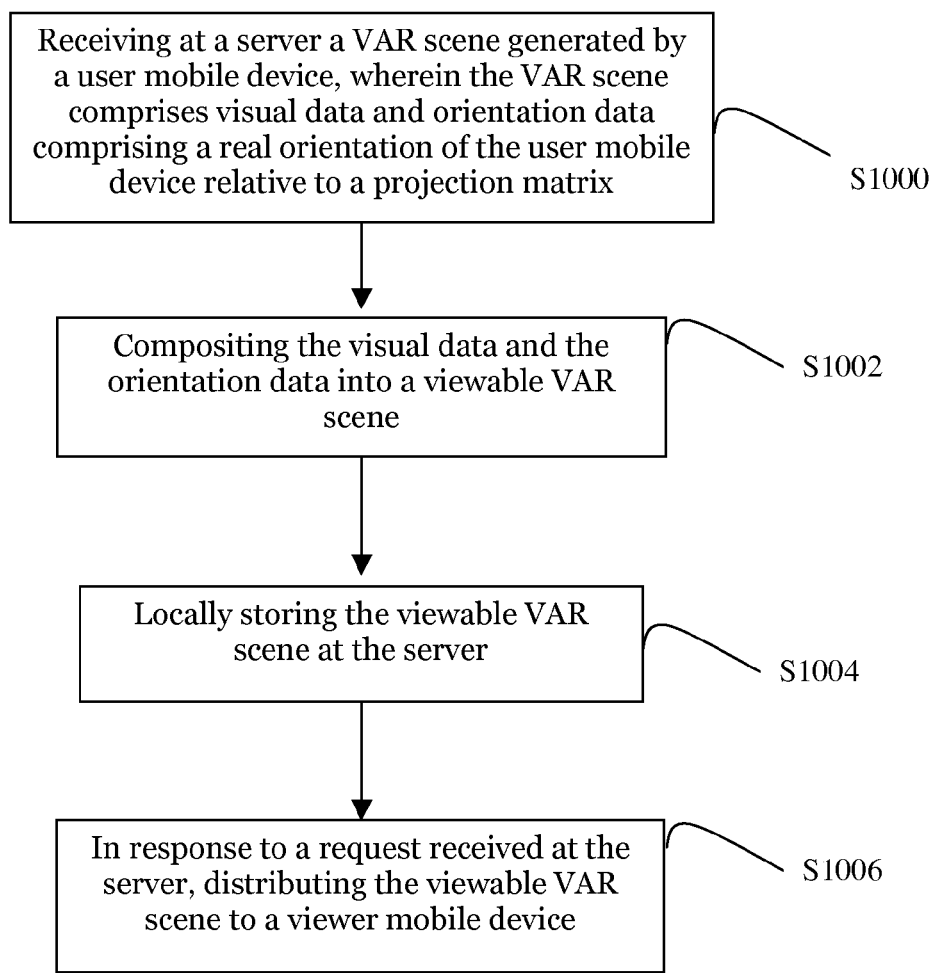
FIG. 10 is a flowchart depicting a method of sharing virtual and augmented reality scenes between users and viewers in accordance with another preferred embodiment of the present invention.

As shown in FIG. 10, a second method of the preferred embodiment can include receiving at a server a VAR scene generated by a user mobile device, wherein the VAR scene includes visual data and orientation data including a real orientation of the user mobile device relative to a projection matrix in block S1000. The second preferred method can further include compositing the visual data and the orientation data into a viewable VAR scene in block S1002, locally storing the viewable VAR scene at the server in block S1004, and in response to a request received at the server, distributing the processed VAR scene to a viewer mobile device in block S1006. The second preferred method functions to receive, create, host, and/or distribute high fidelity VAR scenes that are received from one or more users and distributed to one or more viewers. Preferably, a server usable in the second method of the preferred embodiment can include one or more networked computers, servers, server clusters, databases, data centers, routers, and/or memory storage devices as well as any suitable combination or sub-combination thereof.

As shown in FIG. 10, the second preferred method includes block S1000, which recites receiving at a server a VAR scene generated by a user mobile device, wherein the VAR scene includes visual data and orientation data including a real orientation of the user mobile device relative to a projection matrix. Block S1000 preferably functions to receive a processed or unprocessed VAR scene from at least one user mobile device for subsequent processing and distribution to one or more viewers. As noted above, the VAR scene can include visual data, orientation data, and/or audio data. Suitable visual data can include for example one or more still images arranged in any suitable fashion, such as a substantially spherical series or collection of images. Visual data can alternatively or additionally include one or more video elements such as spherical video frames. The orientation data preferably includes sensor data derived by the user mobile device, such as for example data received from a gyroscope, a MEMS gyroscope, an accelerometer, a magnetometer, a GPS, an altitude sensor, or any suitable combination thereof. As noted above, any one or more sensors can be integrated into the user mobile device or disintegrated or discrete from the user mobile device. The VAR scene data can be received through any available communication means, including wireless or wired communications, and/or through any intermediary systems or devices, such as a user's secondary mobile device or desktop computer.

As shown in FIG. 10, the second preferred method further includes block S1002, which recites compositing the visual data and the orientation data into a viewable VAR scene. Block S1002 preferably functions to perform intermediary processing of the VAR scene between capture by the user mobile device and viewing on the viewer device. Preferably, block S1002 can include aligning any still images and/or video frames into to substantially seamless unitary image when viewed in the VAR scene format, e.g., a spherical image/video. Preferably, compositing the visual data and the orientation data can further include associating one or more projection matrix parameters with the VAR scene. As an example, if the VAR scene is a spherical image, then block S1002 can function to properly correlate and/or pair the perspective of the VAR scene with a matching orientation of a device projection matrix (such as a user mobile device or a viewer mobile device). Optionally, block S1002 can include additional image processing such as image quality matching between images in the same VAR scene. Preferably, the server performs the compositing through a command line tool run on a separate thread. As the server can be configured with substantial processing resources and ample time, more processing of the VAR scene components can occur in block S1002 as compared to those performed by a mobile device, which has a greater breadth of use and relatively limited processing power. Additionally, the server environment is more likely to be subject to the quality control and quality assurance efforts of the system developer, thus resulting in greater fidelity and consistency of the viewable VAR scenes processed and distributable to the one or more viewers.

As shown in FIG. 10, the second preferred method can additionally include block S1004, which recites locally storing the viewable VAR scene at the server. Block S1004 preferably functions to maintain the VAR scene, the viewable VAR scene, and/or any associated VAR scene metadata in a readily accessible local and/or remote memory component of the server for access and/or distribution to one or more viewers. Preferably, local storage of the viewable VAR scene can include storage of a compiled media file that contains tracks of the all of the orientation data, visual data, and/or audio data. Alternatively, each of the orientation data, visual data, and/or audio data can be separately stored and indexed for retrieval and viewing by a viewer. The viewable VAR scene can be stored in compressed or non-compressed formats, and can include sample images, sample audio, sample video, or other readily displayable thumbnail icons that permit browsing of the entire viewable VAR scene database by one or more viewers. Preferably, the viewable VAR scene can be locally stored and indexed by one or more of the following: VAR location, VAR author, VAR augmented content, VAR keyword/s, and/or VAR user account. As an example, the server can be configured to locally store viewable VAR scenes by the location of the VAR scene (as determined by the location data associated with the received VAR scene), such that a viewer can search for viewable VAR scenes according to the location at which the viewer is interested in viewing the VAR scene, i.e., a particular intersection, landmark, street, storefront, building interior, and the like.

As shown in FIG. 10, the second preferred method can further include block S1006, which recites in response to a request received at the server, distributing the viewable VAR scene to a viewer mobile device. Block S1006 preferably functions to distribute, either directly or indirectly, the viewable VAR scene to a viewer mobile device. Preferably, like the user mobile device, the viewer mobile device can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating a projection matrix and/or the associated Euler angles. In the viewer mobile device, orientation and/or position information can be gathered in any suitable fashion, including device Application Programming Interfaces (API) or through any suitable API exposing device information, e.g., using HTML5 to expose device information including orientation/location.

Preferably, the request made of the server is from the viewer mobile device. For example, a viewer browsing published VAR scenes stored on the server can select a scene through a browser link or application link, at which time the request can be transmitted to the server through a Wi-Fi, wired Internet, cellular network, or any other suitable communication channel. In response to the direct request from the viewer mobile device, the server can direct the viewable VAR scene to the application and/or browser for viewing on the viewer mobile device.

Figure 5:
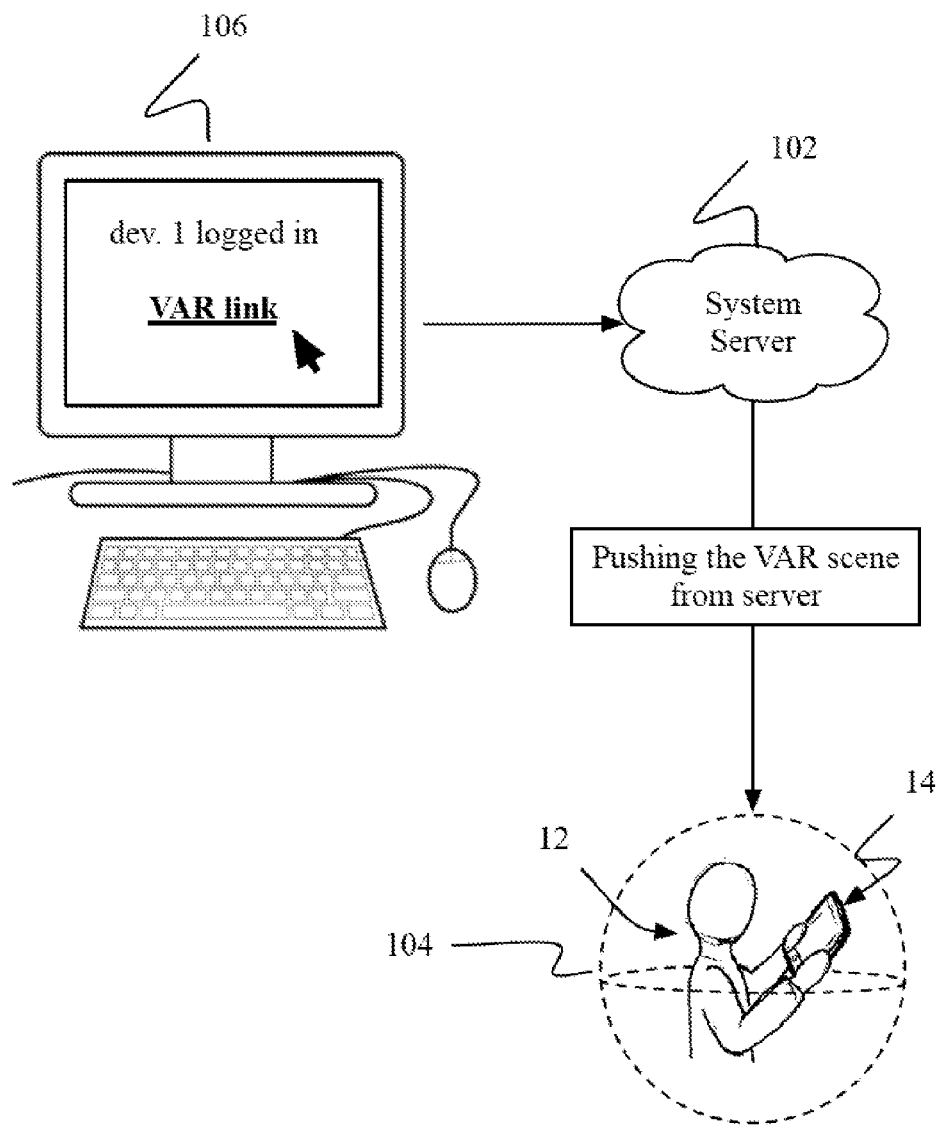
FIG. 5 is a schematic diagram of a system and method for sharing virtual and augmented reality scenes between users and viewers in accordance with variations of the preferred embodiments.
Figure 11:
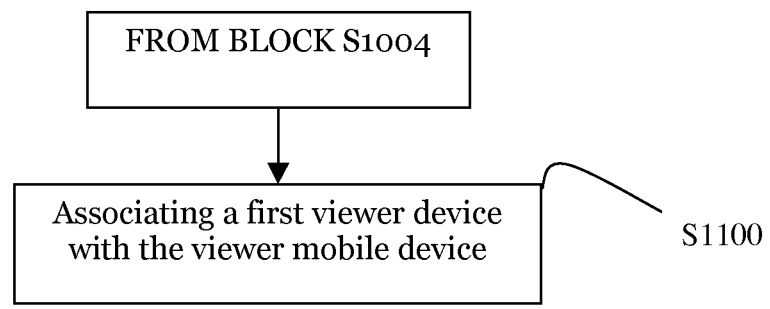
FIG. 11 is a flowchart depicting a method of sharing virtual and augmented reality scenes between users and viewers in accordance with another variation of the preferred embodiment of the present invention.

As shown in FIG. 11, one variation of the second preferred method can include block S1100, which recites associating a first viewer device with the viewer mobile device. Block S1100 preferably functions to permit a viewer to browse and/or select a viewable VAR scene on a first viewer device (i.e., a non-ideal viewing device) but have the server transmit the viewable VAR scene to the viewer mobile device (an ideal viewing device). As shown in FIG. 5, block S1100 permits a user to select the VAR scene on a first viewer device 106 (shown as a desktop computer), which request is directed to the system server 102, which in turn pushes the viewable VAR scene to a viewer mobile device 14. Example first viewer devices can include non-ideal devices that are immobile or otherwise difficult to physically maneuver to view the entire VAR scene, such as for example desktop computers and Internet capable televisions. Preferably, block S1100 can include creating a viewer account on the server that is accessible from the first viewer device and the viewer mobile device, thereby associating the user with a cookie and/or a username/password combination. Preferably, the viewer accesses his or her account on the viewer mobile device (e.g., through a dedicated application on a smartphone or tablet computer) and creates a token such as a device token or push token associated with the username. Accordingly, when the logged in viewer selects a VAR scene on the first viewer device, the server preferably directly pushes the viewable VAR scene to the viewer mobile device. Additionally, the server can provide a listing or index of all available associated devices for any user account, which can be accessible through any suitable viewer device. If the viewer has more than one device associated with his or her user account, he or she can instruct the server to push the viewable VAR scene to a selected device, which need not be an ideal viewing device. Preferably, the viewable VAR scene includes VAR scene data processed by the server. In the variation where the VAR scene depicts a substantially spherical space, the VAR scene data preferably includes six sides of a cube as images or alternatively videos, an audio file, and a list of orientations. Other aspects of the VAR scene may also be sent such as annotations or additional elements included in the VAR scene. The data is preferably communicated through JavaScript object notation (JSON), but any suitable object notation or data structure may alternatively be used.

Figure 12:
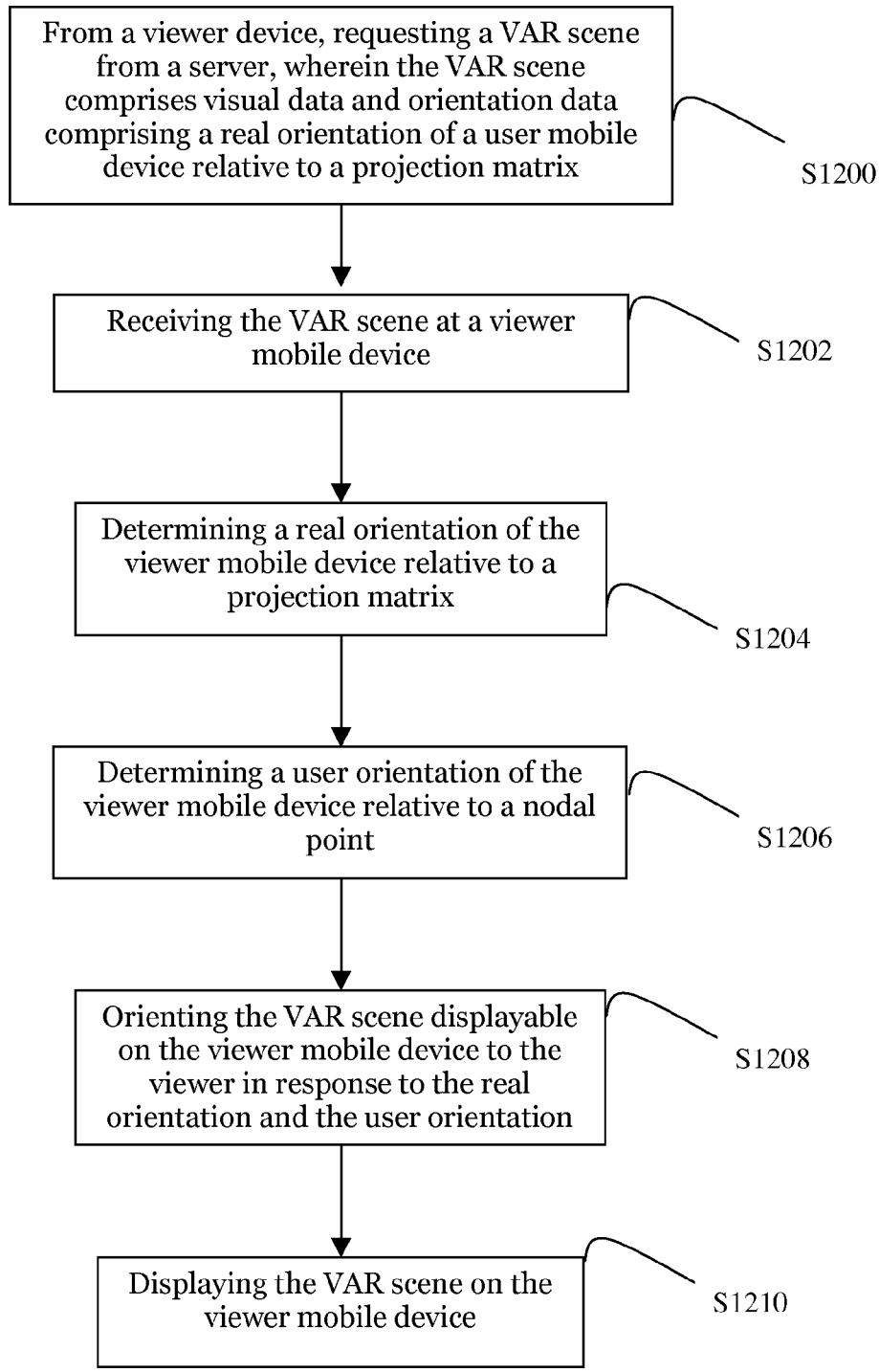
FIG. 12 is a flowchart depicting a method of sharing virtual and augmented reality scenes between users and viewers in accordance with another preferred embodiment of the present invention.

As shown in FIG. 12, a third method of the preferred embodiment can include block S1200, which recites from a viewer device, requesting a VAR scene from a server, wherein the VAR scene includes visual data and orientation data including a real orientation of a mobile device relative to a projection matrix. The third preferred method can also include receiving the VAR scene at a viewer mobile device in block S1202, determining a real orientation of the viewer mobile device relative to a projection matrix in block S1204, and determining a user orientation of the viewer mobile device relative to a nodal point in block S1206. The third preferred method can also include orienting a scene displayable on the viewer mobile device to the viewer in response to the real orientation and the user orientation in block S1208 and displaying the VAR scene on the viewer mobile device in block S1210. The third preferred method functions to retrieve, receive, render, and/or display a server-hosted VAR scene to a viewer on his or her viewer mobile device.

As shown in FIG. 12, the third preferred embodiment includes block S1200, which recites from a viewer device, requesting a VAR scene from a server. Preferably, the VAR scene includes visual data, orientation data, and/or audio data, and the orientation data preferably includes a real orientation of a mobile device relative to a projection matrix. The real orientation of a mobile device relative to a projection matrix can include any suitable type of device, including the user mobile device that created the VAR scene, the viewer mobile device on which the VAR scene is to be viewed, or an archetypal mobile device that is independent of the type of device on which the VAR scene is captured/viewed. Preferably, the viewer device is one of a first viewer device or a mobile viewer device. As noted above, suitable visual data can include for example one or more still images arranged in any suitable fashion, such as a substantially spherical series or collection of images. Visual data can alternatively or additionally include one or more video elements such as spherical video frames. The orientation data preferably includes sensor data derived by the user mobile device and usable by the viewer mobile device, such as for example data received from a gyroscope, a MEMS gyroscope, an accelerometer, a magnetometer, a GPS, an altitude sensor, or any suitable combination thereof. Any one or more sensors can be integrated into the viewer mobile device in order to assist in viewing the entire VAR scene. The VAR scene data can be received at the viewer mobile device through any available communication means, including wireless or wired communications, and/or through any intermediary systems or devices, such as a user's secondary mobile device or desktop computer.

As shown in FIG. 12, the third preferred method can include block S1202, which recites receiving the VAR scene at a viewer mobile device. Block S1202 preferably functions to direct the VAR scene to the viewer mobile device in response to a request from the viewer mobile device, the first viewer device, or any other device/s associated with the viewer. As noted above with respect to FIG. 5, the VAR scene can be requested from the server on a first viewer device (a non-ideal viewing device) and received and/or viewed on an associated viewer mobile device. Preferably, the VAR scene is processed by the server prior to receipt by the viewer mobile device. Suitable processing can include at least those functions described above with reference to FIG. 10. Alternatively, the VAR scene can be received at the viewer mobile device in a raw or partially processed form in such a manner that the viewer mobile device can perform any needed or desired processing of the VAR scene locally. In another alternative, the VAR scene can be retrieved from the server in processed, partially processed, and/or raw formats based upon viewer selection, network speeds, viewer mobile device processing capacity, and/or any other suitable parameter.

As shown in FIG. 12, the third preferred method can include block S1204, which recites determining a real orientation of the viewer mobile device relative to a projection matrix. Block S1204 functions to provide a frame of reference for the viewer mobile device as it relates to a world around it, wherein the world around can include real three dimensional space, a virtual reality space, an augmented reality space, or any suitable combination thereof. Preferably, the projection matrix can include a mathematical representation of an arbitrary orientation of a three-dimensional object having three degrees of freedom relative to a second frame of reference. As an example, the projection matrix can include a mathematical representation of a viewer mobile device's orientation in terms of its Euler angles (pitch, roll, yaw) in any suitable coordinate system. In one variation of the third preferred method, the second frame of reference can include a three-dimensional external frame of reference (i.e., real space) in which the gravitational force defines baseline directionality for the relevant coordinate system against which the absolute orientation of the viewer mobile device can be measured. Preferably, the real orientation of the viewer mobile device can include an orientation of the viewer mobile device relative to the second frame of reference, which as noted above can include a real three-dimensional frame of reference. In such an example implementation, the viewer mobile device will have certain orientations corresponding to real world orientations, such as up and down, and further such that the viewer mobile device can be rolled, pitched, and/or yawed within the external frame of reference.

As shown in FIG. 12, the third preferred method further includes block S1206, which recites determining a user orientation of the viewer mobile device relative to a nodal point. Block S1206 preferably functions to provide a frame of reference for the viewer mobile device relative to a point or object in space, including a point or object in real space. Preferably, the user orientation can include a measurement of a distance and/or rotational value/s of the viewer mobile device relative to the nodal point. In another variation of the method of the preferred embodiment, the nodal point can include a viewer's head such that the user orientation includes a measurement of the relative distance and/or rotational value/s of the viewer mobile device relative to a viewer's field of view. Alternatively, the nodal point can include a portion of the viewer's head, such as for example a point between the viewer's eyes. In another alternative, the nodal point can include any other suitable point in space, including for example any arbitrary point such as an inanimate object, a group of users, a landmark, a location, a waypoint, a predetermined coordinate, and the like. Preferably, the user orientation functions to create a viewing relationship between a viewer (optionally located at the nodal point) and the viewer mobile device, such that a change in user orientation can cause a consummate change in viewable content consistent with the viewer's VAR interaction, i.e., such that the viewer's view through the frame of the viewer mobile device will be adjusted consistent with the viewer's orientation relative to the frame of the viewer mobile device.

As shown in FIG. 12, the third preferred method can also include block S1208, which recites orienting the VAR scene displayable on the viewer mobile device to a user in response to the real orientation and the user orientation. Block S1208 preferably functions to process, compute, calculate, determine, and/or create a VAR scene that can be displayed on the viewer mobile device to a user, wherein the VAR scene is oriented to mimic the effect of the viewer viewing the VAR scene as if through the frame of the viewer mobile device. Preferably, orienting the scene can include preparing a VAR scene for display such that the viewable scene matches what the viewer would view in a real three-dimensional view, that is, such that the displayable scene provides a simulation of real viewable space to the viewer as if the device were a transparent frame. Preferably, the VAR scene can include one or more virtual and/or augmented reality elements composing, in addition to, and/or in lieu of one or more real elements (buildings, roads, landmarks, and the like, either real or fictitious). Alternatively, the VAR scene can include processed or unprocessed images/videos/multimedia files of a multitude of scene aspects, including both actual and fictitious elements as noted above.

As shown in FIG. 12, the third preferred method can also include block S1210, which recites displaying the scene on the viewer mobile device. Block S1210 preferably functions to render, present, project, image, and/or display viewable content on, in, or by a viewer mobile device of the type described herein. Preferably, the displayable scene can include a spherical image of a space having virtual and/or augmented reality components. In one variation of the third preferred method, the spherical image displayable on the device can be substantially symmetrically disposed about the nodal point, i.e. the nodal point is substantially coincident with and/or functions as an origin of a spheroid upon which the image is rendered.

Figure 13:
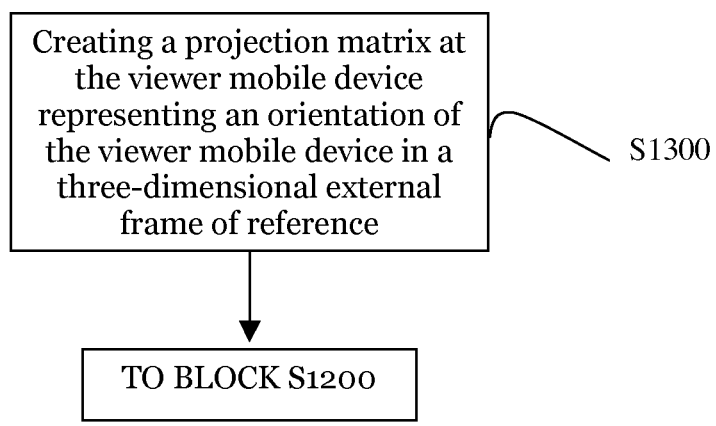
FIG. 13 is a flowchart depicting a method of sharing virtual and augmented reality scenes between users and viewers in accordance with another variation of the preferred embodiment of the present invention.

As shown in FIG. 13, a variation of the third preferred method can include block S1300, which recites creating a projection matrix at the viewer mobile device representing an orientation of the viewer mobile device in a three-dimensional external frame of reference. Block S1300 preferably functions to coordinate the displayable scene with a physical orientation of the viewer mobile device as established by and/or relative to a viewer. As noted above, the projection matrix preferably includes a mathematical representation of an arbitrary orientation of a three-dimensional object having three degrees of freedom relative to the external frame of reference. In one variation of the third preferred method, the external frame of reference can include a three-dimensional external frame of reference (i.e., real space) in which the gravitational force defines baseline directionality for the relevant coordinate system against which the absolute orientation of the viewer mobile device can be measured. Alternatively, the external frame of reference can include a fictitious external frame of reference, i.e., such as that encountered in a film or novel, whereby any suitable metrics and/or geometries can apply for navigating the device through the pertinent orientations. One example of a fictitious external frame of reference can include a fictitious space station frame of reference, wherein there is little to no gravitational force to provide the baseline directionality noted above. In such an example implementation, the external frame of reference can be fitted or configured consistently with the other features of the VAR scene.

Figure 14:
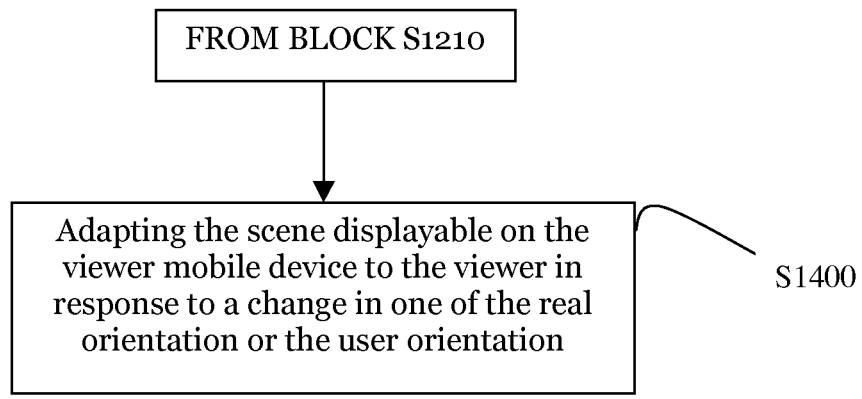
FIG. 14 is a flowchart depicting a method of sharing virtual and augmented reality scenes between users and viewers in accordance with another variation of the preferred embodiment of the present invention.

As shown in FIG. 14, another variation of the third preferred method can include block S1400, which recites adapting the scene displayable on the viewer mobile device to the user in response to a change in one of the real orientation or the user orientation. Block S1400 preferably functions to alter, change, reconfigure, recompute, regenerate, and/or adapt the displayable scene in response to a change in the real orientation or the user orientation. Additionally, block S1400 preferably functions to create a uniform and immersive viewer experience by adapting the displayable scene consistent with movement of the viewer mobile device relative to the projection matrix and/or relative to the nodal point. Preferably, adapting the displayable scene can include at least one of adjusting a virtual zoom of the scene, adjusting a virtual parallax of the scene, adjusting a virtual perspective of the scene, and/or adjusting a virtual origin of the scene. Alternatively, adapting the displayable scene can include any suitable combination of the foregoing, performed substantially serially or substantially simultaneously, in response to a timing of any determined changes in one or both of the real orientation or the user orientation.

Figure 15:
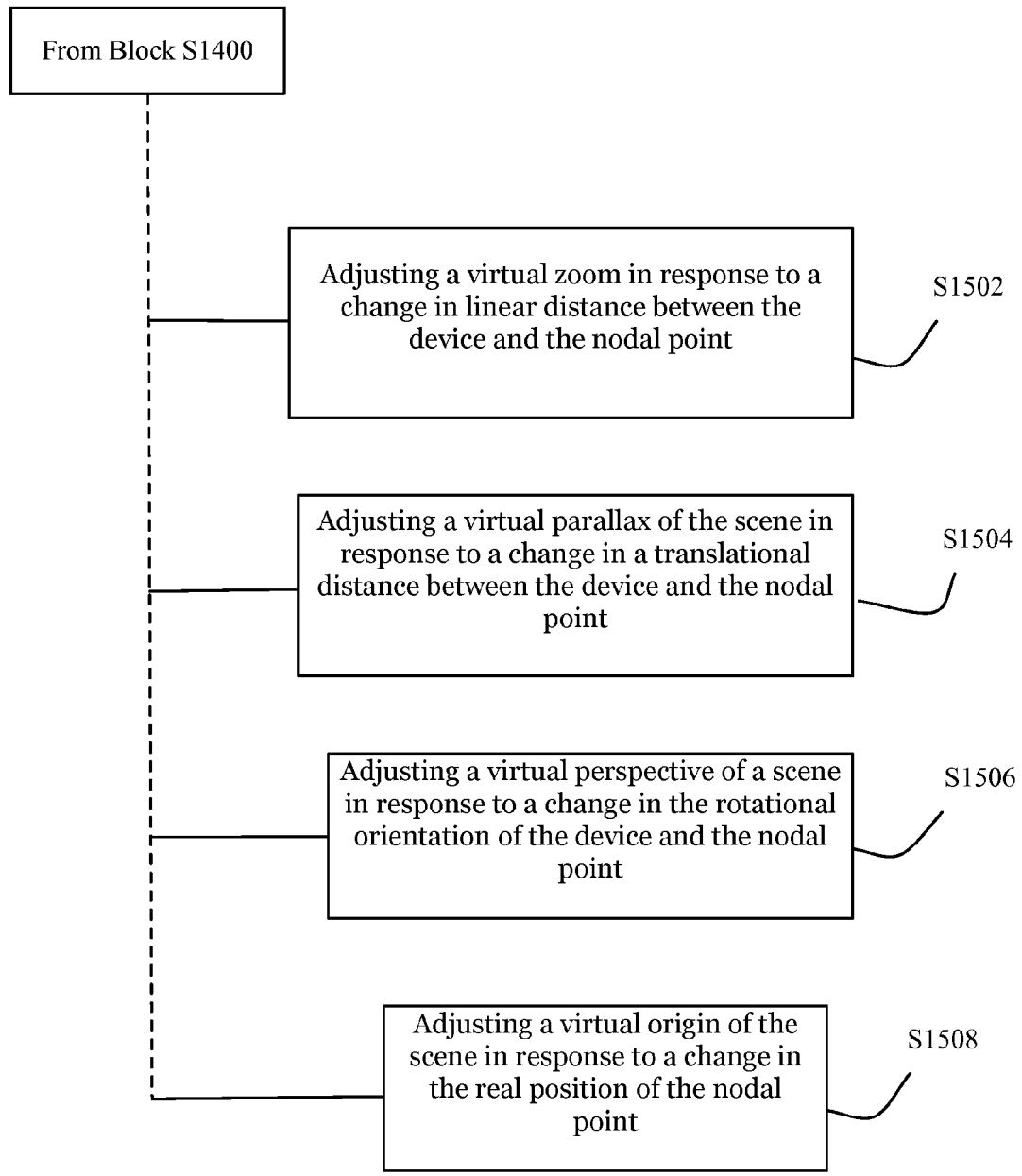
FIG. 15 is a flowchart depicting a method of sharing virtual and augmented reality scenes between users and viewers in accordance with another variation of the preferred embodiment of the present invention.

As shown in FIG. 15, another variation of the third preferred method can include block S1502, which recites adjusting a virtual zoom of the scene in response to a change in a linear distance between the device and the nodal point. Block S1502 preferably functions to resize one or more displayable aspects of the scene in response to a distance between the device and the nodal point to mimic a change in the viewing distance of the one or more aspects of the scene. As noted above, the nodal point can preferably be coincident with a user's head, such that a distance between the device and the nodal point correlates substantially directly with a distance between a user's eyes and the device. Accordingly, adjusting a virtual zoom can function in part to make displayable aspects of the scene relatively larger in response to a decrease in distance between the device and the nodal point; and to make displayable aspects of the scene relatively smaller in response to an increase in distance between the device and the nodal point. Another variation of the third preferred method can include measuring a distance between the device and the nodal point, which can include for example using a front facing camera to measure the relative size of the nodal point (i.e., the user's head) in order to calculate the distance. Alternatively, the adjustment of the virtual zoom can be proportional to a real zoom (i.e., a real relative sizing) of the nodal point (i.e., the user's head) as captured by the device camera. Accordingly, as the distance decreases/increases, the size of the user's head will appear to increase/decrease, and the adjustment in the zoom can be linearly and/or non-linearly proportional to the resultant increase/decrease imaged by the camera. Alternatively, the distance between the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof.

As shown in FIG. 15, another variation of the third preferred method can include block S1504, which recites adjusting a virtual parallax of the scene in response to a change in a translational distance between the device and the nodal point. Block S1504 preferably functions to reorient the relative size and/or placement of one or more aspects of the displayable scene in response to a translational movement between the device and the nodal point. A translational movement can include for example a relative movement between the nodal point and the device in or along a direction substantially perpendicular to a line of sight from the nodal point, i.e., substantially tangential to an imaginary circle having the nodal point as its origin. As noted above, the nodal point can preferably be coincident with a user's head, such that the translational distance between the device and the nodal point correlates substantially directly with a distance between a user's eyes and the device. Accordingly, adjusting a virtual parallax can function in part to adjust a positioning of certain displayable aspects of the scene relative to other displayable aspects of the scene. In particular, adjusting a virtual parallax preferably causes one or more foreground aspects of the displayable scene to move relative to one or more background aspects of the displayable scene. Another variation of the third preferred method can include identifying one or more foreground aspects of the displayable scene and/or identifying one or more background aspects of the displayable scene. Preferably, the one or more foreground aspects of the displayable scene are movable with respect to the one ore more background aspects of the displayable scene such that, in block S1504, the third preferred method can create and/or adjust a virtual parallax viewing experience for a user in response to a change in the translational distance between the device and the nodal point.

Another variation of the third preferred method can include measuring a translational distance between the device and the nodal point, which can include for example using a front facing camera to measure the relative size and/or location of the nodal point (i.e., the user's head) in order to calculate the translational distance. Alternatively, the translational distance between the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof. Preferably, the translational distance can be measured by a combination of the size of the nodal point (from the front facing camera) and a detection of a planar translation of the device in a direction substantially orthogonal to the direction of the camera, thus indicating a translational movement without any corrective rotation. For example, one or more of the foregoing sensors can determine that the device is moved in a direction substantially orthogonal to the camera direction (tangential to the imaginary sphere surrounding the nodal point), while also determining that there is no rotation of the device (such that the camera is directed radially inwards towards the nodal point). Preferably, the third preferred method can treat such a movement as translational in nature and adapt a virtual parallax of the viewable scene accordingly.

As shown in FIG. 15, another variation of the third preferred method can include block S1506, which recites adjusting a virtual perspective of the scene in response to a change in a rotational orientation of the device and the nodal point. Block S1506 preferably functions to reorient, reshape, resize, and/or skew one or more aspects of the displayable scene to convey a sense of perspective and/or a non-plan viewing angle of the scene in response to a rotational movement of the device relative to the nodal point. Preferably, adjustment of the virtual perspective of the scene is related in part to a distance between one end of the device and the nodal point and a distance between the other end of the device and the nodal point. As an example, if a left/top side of the device is closer to the nodal point then the right/bottom side of the device, then aspects of the left/top portion of the scene should be adapted to appear relatively closer (i.e., displayable larger) than aspects of the right/bottom portion of the scene. Preferably, adjustment of the aspects of the scene to create the virtual perspective will apply both to foreground aspects and background aspects, such that the third preferred method adjusts the virtual perspective of each aspect of the scene in response to at least its position in the scene, the degree of rotation of the device relative to the nodal point, the relative depth (foreground/background) of the aspect, and/or any other suitable metric or visual cue. As an example, lines that are parallel in the scene when the device is directed at the nodal point (all edges equidistant from the nodal point) will converge in some other direction in the display (i.e., to the left, right, top, bottom, diagonal, etc.) as the device is rotated. Preferably, if the device is rotated such that the left edge is closer to the nodal point than the right edge, then formerly parallel lines can be adjusted to converge towards infinity past the right edge of the device, thus conveying a sense of perspective to the user.

Another variation of the third preferred method can include measuring a rotational orientation between the device and the nodal point, which can include for example using a front facing camera to measure the relative position of the nodal point (i.e., the user's head) in order to calculate the rotational orientation. Alternatively, the rotational orientation of the nodal point and the device can be measured and/or inferred from any other suitable sensor and/or metric, including at least those usable by the device in determining the projection matrix as described below, including for example one or more cameras (front/rear), an accelerometer, a gyroscope, a MEMS gyroscope, a magnetometer, a pedometer, a proximity sensor, an infrared sensor, an ultrasound sensor, and/or any suitable combination thereof. Preferably, the rotational orientation can be measured by a combination of the position of the nodal point (as detected by the front facing camera) and a detection of a rotation of the device that shifts the direction of the camera relative to the nodal point. As an example, a front facing camera can be used to determine a rotation of the device by detecting a movement of the nodal point within the field of view of the camera (indicating that the device/camera is being rotated in an opposite direction). Accordingly, if the nodal point moves to the bottom/right of the camera field of view, then the third preferred method can determine that the device is being rotated in a direction towards the top/left of the camera field of view. In response to such a rotational orientation, the third preferred method preferably mirrors, adjusts, rotates, and/or skews the viewable scene to match the displaced perspective that the device itself views through the front facing camera.

As shown in FIG. 15, another variation of the third preferred method can include block S1508, which recites adjusting a virtual origin of the scene in response to a change in a real position of the nodal point. Block S1508 preferably functions to reorient, reshape, resize, and/or translate one or more aspects of the displayable scene in response to the detection of actual movement of the nodal point. In one variation of the third preferred method, the nodal point can include an arbitrary point in real or fictitious space relative to which the scenes described herein are displayable. Accordingly, any movement of the real or fictitious nodal point preferably results in a corresponding adjustment of the displayable scene. In another variation of the third preferred method, the nodal point can include a user's head or any suitable portion thereof. In such an implementation, movement of the user in real space can preferably be detected and used for creating the corresponding adjustments in the displayable scene. The real position of the nodal point can preferably be determined using any suitable combination of devices, including for example one or more cameras (front/rear), an accelerometer, a gyroscope, a MEMS gyroscope, a magnetometer, a pedometer, a proximity sensor, an infrared sensor, and/or an ultrasound sensor. As an example, a user can wear a pedometer in communication with the device such that when the user walks through real space, such movement of the user/nodal point is translated into movement in the VAR space, resulting in a corresponding adjustment to the displayable scene. Another variation of the third preferred method can include determining a position and/or motion of the device in response to location service signal associated with the device. Example location service signals can include global positioning signals and/or transmission or pilot signals transmittable by the device in attempting to connect to an external network, such as a mobile phone or Wi-Fi type wireless network. Preferably, the real movement of the user/nodal point in space can result in the adjustment of the location of the origin/center/viewing point of the displayable scene.

The user and viewer devices 14 and methods of the preferred embodiment can be embodied and/or implemented at least in part as a machine configured to receive a computer-readable medium storing computer-readable instructions. The instructions are preferably executed by computer-executable components preferably integrated with the user/viewer device 14 and one or more portions of the processor 70, orientation module 50 and/or location module 60. Other systems and methods of the preferred embodiment can be embodied and/or implemented at least in part as a machine configured to receive a computer-readable medium storing computer-readable instructions. The instructions are preferably executed by computer-executable components preferably integrated by computer-executable components preferably integrated with a user/viewer device 14, a server 102, and/or a first viewer device 106 of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   capturing a VAR scene with a mobile device at a location, wherein the VAR scene comprises a plurality of images captured by the mobile device, wherein each image of the plurality of images is associated with orientation data corresponding to a first orientation of the mobile device relative to a three-dimensional frame of reference;
   correlating the plurality of images based on each image's orientation data at the mobile device;
   compressing at least the correlated plurality of images at the mobile device to generate a processed VAR scene; and
   transmitting the processed VAR scene to a server.

2. The method of claim 1, further comprising creating a projection matrix representing an orientation of the device in a three-dimensional external frame of reference.

3. The method of claim 1, wherein the orientation data further comprises a second orientation of the mobile device relative to a nodal point separate from the mobile device.

4. The method of claim 1, wherein compressing at least the correlated plurality of images comprises down-sampling the one or more still images and fitting the down-sampled one or more still images onto a single texture.

5. The method of claim 1, further comprising blending the correlated plurality of images.

6. The method of claim 5, wherein blending the correlated plurality of images comprises premultiplying an image with a one of a Gaussian kernel or a smoothstep kernel.

7. The method of claim 1, wherein the plurality of images comprises a video comprising a series of frames.

8. The method of claim 1, wherein the VAR scene further comprises audio data.

9. The method of claim 1, further comprising locally storing the processed VAR scene on the mobile device.

10. The method of claim 1, wherein transmitting the processed VAR scene comprises transmitting metadata about the VAR scene to the server.

11. The method of claim 1, wherein transmitting the processed VAR scene comprises asynchronously transmitting the correlated plurality of images and the orientation data to the server.

12. The method of claim 11, further comprising associating a universally unique identifier with at least the correlated plurality of images, wherein the universally unique identifier for an image is based on a hash of a pathname associated with the image.

13. A method comprising:
receiving at a server a VAR scene generated by a mobile device, wherein the VAR scene comprises a plurality of images captured by the mobile device, wherein each image of the plurality of images is associated with orientation data corresponding to a real orientation of the mobile device in three-dimensional space relative to a projection matrix;
compositing the plurality of images based on each image's orientation data into a viewable VAR scene;
locally storing the viewable VAR scene at the server; and
in response to a request received at the server, distributing the processed VAR scene to a viewer mobile device.

14. The method of claim 13, wherein compositing the plurality of images based on each image's orientation data comprises aligning one or more still images into a substantially uniform spherical image.

15. The method of claim 14, wherein compositing the plurality of images based on each image's orientation data comprises associating one or more projection matrix parameters with the substantially uniform spherical image.

16. The method of claim 13, further comprising associating a first viewer device with the viewer mobile device.

17. The method of claim 16, wherein distributing the viewable VAR scene comprises pushing the VAR scene to the viewer mobile device in response to a request received from the first viewer device.

18. A method comprising:
from a viewer mobile device, requesting a VAR scene from a server, wherein the VAR scene comprises a plurality of images captured by a capture mobile device, wherein each image of the plurality of images is associated with orientation data corresponding to an orientation of the capture mobile device relative to a three-dimensional frame of reference;
receiving the VAR scene at the viewer mobile device;
determining a first orientation of the viewer mobile device relative to a three-dimensional frame of reference;
determining a second orientation of the viewer mobile device relative to a nodal point;
using the orientation data of the capture mobile device associated with each of the plurality of images in the VAR scene, orienting the VAR scene displayable on the viewer mobile device to the viewer based on the first orientation and the second orientation of the viewer mobile device; and
displaying the VAR scene on the viewer mobile device.

19. The method of claim 18, wherein the VAR scene is processed by the server prior to receipt by the viewer mobile device.

20. The method of claim 18, further comprising creating a projection matrix at the viewer mobile device representing an orientation of the viewer mobile device in a three-dimensional external frame of reference.

21. The method of claim 18, further comprising adapting the VAR scene displayable on the viewer mobile device to the viewer in response to a change in one of the first orientation or the second orientation.

22. The method of claim 18, wherein the capture mobile device and the viewer mobile device are the same device.

* * * * *